United States Patent
Uccello et al.

(10) Patent No.: US 7,159,349 B2
(45) Date of Patent: Jan. 9, 2007

(54) SIGN AND AWNING ATTACHMENT SYSTEM AND METHOD OF USE

(75) Inventors: Abraham Uccello, Sarasota, FL (US); Antonio F. Uccello, III, Bradenton, FL (US); Salvatore A. Uccello, Sarasota, FL (US)

(73) Assignee: Sign Media Systems, Inc., Sarasota, FL (US)

( * ) Notice: Subject to any disclaimer, the term of this patent is extended or adjusted under 35 U.S.C. 154(b) by 68 days.

(21) Appl. No.: 10/341,471

(22) Filed: Jan. 14, 2003

(65) Prior Publication Data

US 2003/0172568 A1    Sep. 18, 2003

Related U.S. Application Data

(60) Provisional application No. 60/348,316, filed on Jan. 15, 2002, provisional application No. 60/386,406, filed on Jun. 7, 2002.

(51) Int. Cl.
*G09F 17/00* (2006.01)

(52) U.S. Cl. ............................................. 40/603; 40/590

(58) Field of Classification Search ................ 40/590, 40/603–604, 790; 160/328, 378; 38/102.1
See application file for complete search history.

(56) References Cited

U.S. PATENT DOCUMENTS

| | | | | |
|---|---|---|---|---|
| 2,554,542 A * | 5/1951 | Rust et al. | ................. | 160/328 |
| 4,739,568 A * | 4/1988 | Gearhart | ...................... | 40/603 |
| 5,142,804 A * | 9/1992 | Hillstrom et al. | ............. | 40/603 |
| 5,239,765 A | 8/1993 | Opdahl | | |
| 5,255,459 A * | 10/1993 | Verret | ......................... | 40/603 |
| 5,507,109 A | 4/1996 | Rinzler | | |
| 5,577,830 A * | 11/1996 | Barry et al. | | |
| 6,041,535 A * | 3/2000 | Holloway et al. | ............ | 60/603 |
| 6,250,002 B1 | 6/2001 | Wittenberg | | |
| 6,393,746 B1 | 5/2002 | Jacobson | | |
| 6,862,825 B1 * | 3/2005 | Lowndes | ..................... | 40/603 |

FOREIGN PATENT DOCUMENTS

WO    WO 01/35382    *  5/2001    ................. 40/603

* cited by examiner

*Primary Examiner*—Cassandra Davis
(74) *Attorney, Agent, or Firm*—Fish & Richardson P.C.

(57) ABSTRACT

An attachment and tensioning system for a planar structure, including a flexible structure, for use with a sign, awning, mural, painting canvas, or roll-up door. One variation includes a first fixed portion for attaching one edge of the structure, such as via an opening for receiving a beaded or otherwise lockable structure edge, a moveable portion attachable to a second structure edge, and a tensioning device coupleable to the moveable portion and a second fixed portion. In one variation, the tensioning device attaches to and tensions the planar structure via levering. In another variation, the planar structure includes pairs of opposite edges, the first fixed portion and the moveable portion being located on an opposing pair of edges, and a second fixed portion and second moveable portion being located on another opposing pair of edges. Another variation includes two fixed attachment sections, and the planar structure has a stretchable section.

9 Claims, 25 Drawing Sheets

185 173 173

173

170, 180

185, 186

171, 181

190, 191

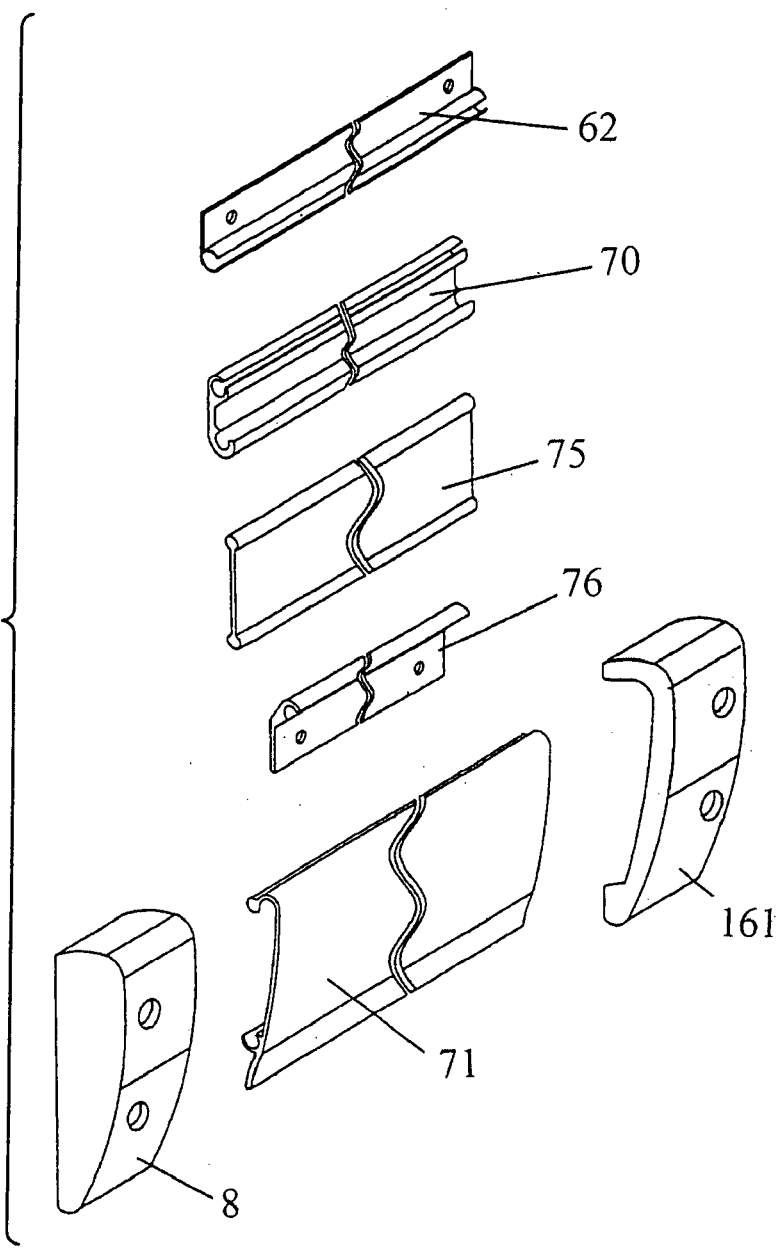
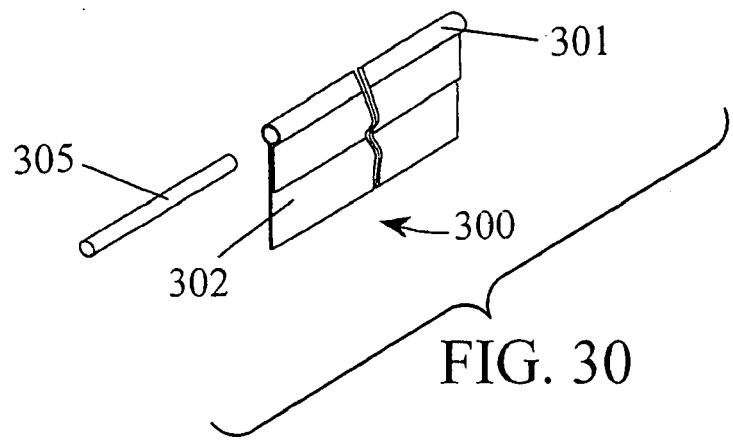

FIG. 31
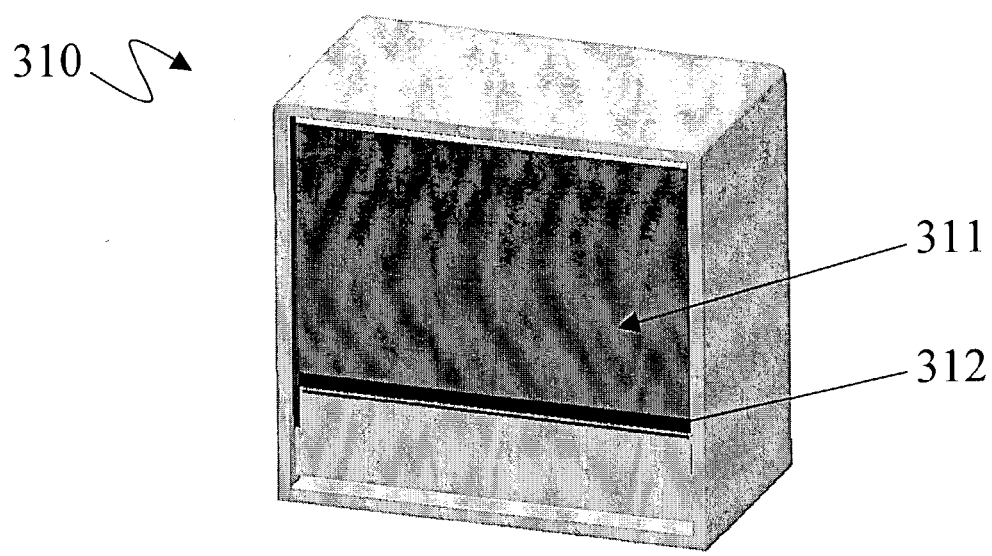
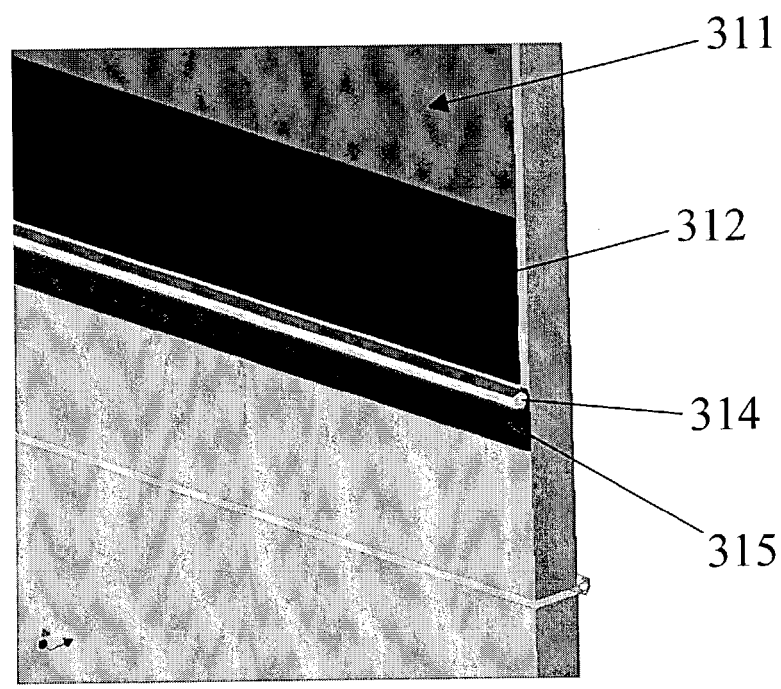
FIG. 32

FIG. 35
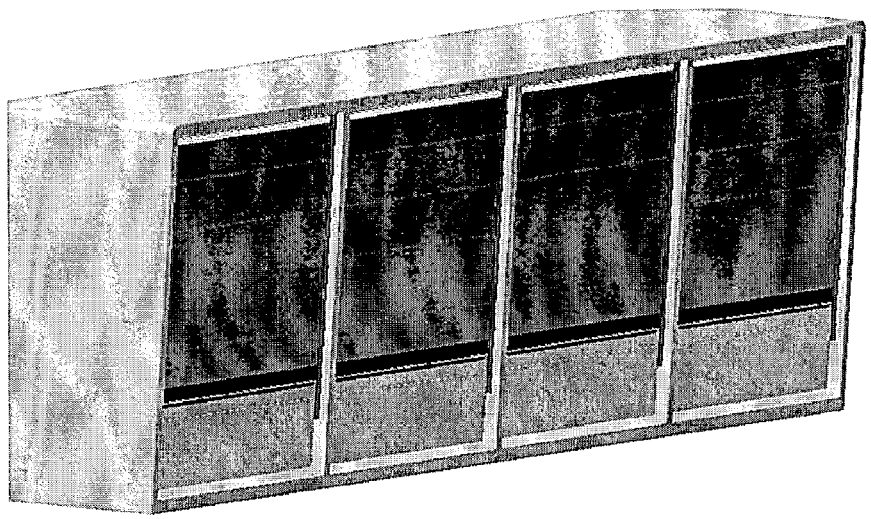
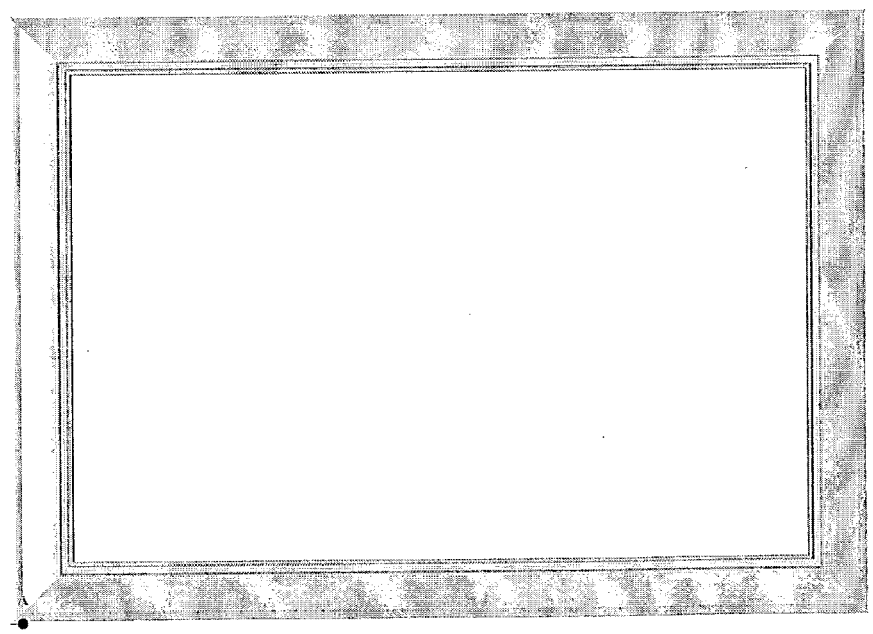
FIG. 36

SIGN AND AWNING ATTACHMENT SYSTEM AND METHOD OF USE

This application claims priority from U.S. Provisional Patent Application Ser. No. 60/348,316 filed Jan. 15, 2002, and U.S. Provisional Patent Application Ser. No. 60/386,406 filed Jun. 7, 2002. The entirety of each of these provisional applications is incorporated herein by reference.

BACKGROUND OF THE INVENTION

1. Field of the Invention

The present invention relates to the field of attachment systems for signs, awnings, and other generally planar shaped devices.

2. Background of the Technology

It is known in the art to provide vehicle sign attachment devices. However, these prior art devices generally do not allow flexible replacement of the sign, are unnecessarily complex to use, or are otherwise prone to problems or difficulties with use. For example, U.S. Pat. No. 6,393,746 to Jacobson, which is hereby incorporated by reference, discusses problems with various prior art systems and discloses a channel and bolt system for attaching and tensioning a sign to a truck-side, in which a complex system of channels, L-angle extrusions, and bolts attached to the sign are used to hold and slowly apply tension to the sign by rotation of bolts. Among other problems, the invention of Jacobson is difficult to install and is cumbersome to use.

Other vehicle sign attachment systems, methods, and devices known in the art include those disclosed in U.S. Pat. No. 5,239,765 to Opdahl, U.S. Pat. No. 5,507,109 to Rinzler, and U.S. Pat. No. 6,250,002 to Wittenberg, each of which is hereby incorporated by reference. The advertising display of Opdahl includes stays attached to the sign and attaching retainers, which, for example, are bolted to a vehicle to hold the sign in a tensioned state. As with the invention of Jacobson, the invention of Opdahl is difficult to install and use.

The mobile advertising display of Rinzler uses a combination of retaining rods and tracks, along with a hook and cord assembly to provide an easier to use system. However, the invention of Rinzler is somewhat unsightly with the hook and cord assembly, and the hooks and cords can be cumbersome and slow during installation of the sign.

The invention of Wittenberg uses a combination of sign protrusions, fixed attachment points, and a crossover latch rail used to tensionably hold the sign on the vehicle. Once the sign is tensioned, the latch rail is bolted into place. While relatively simple, the system of Wittenberg remains cumbersome to install and use when replacing signs, as, for example, it is not flexible as to variations in vehicle size and bolting and unbolting are required for replacement of the sign. Further, the bolted ends of the latch rails can be unsightly.

It is also known in the art to provide shutters and to nail or otherwise attach boards or other protective planar devices over windows of buildings during storm events. However, these systems are either prone to damage prior to use, inadequate in storm events, or generally not easily reusable.

There remains an unmet need to provide a simple, attractive, and flexibly usable system for such applications as vehicle sign attachment and tensioning, easily usable with a range of vehicle sizes, as well as to provide other flexible, reliable, and reusable attachment and tensioning systems for planar devices, such as for awnings for buildings for use in storm events to protect windows, doors, etc.

SUMMARY OF THE INVENTION

The present invention overcomes the above identified unmet needs of the prior art, as well as others, by providing an attachment and tensioning system for a planar structure, such as a sign or awning, including a planar structure with a flexible face or composed of a flexible material, such as canvas or vinyl. The tensioning system includes a first fixed portion for attaching one edge of the structure, such as via a slotted opening for receiving a beaded or otherwise lockable edge of the structure, a moveable portion attachable to a second edge of the structure, and a tensioning device coupleable to the moveable portion and a second fixed portion. The tensioning device is used to fixably hold and tension the planar structure via levering action. In one embodiment, the planar structure includes two pairs of opposite edges, the first fixed portion and the moveable portion being located on an opposing first pair of edges (e.g., at the top and bottom of a sign or awning), and the system further including a second fixed portion and second moveable portion located on another opposing pair of edges (e.g., at the two opposite vertical side edges of a sign or awning). The sign or awning of this embodiment is thus attached and tensioned in both a vertical direction and a horizontal direction.

In one embodiment, the fixed portion and the moveable portion each have a generally C-shaped cross-section for receiving the beaded or otherwise lockable edge of the structure. Another embodiment includes attachable end caps to secure the tensioning device in a locked position.

The system is usable in variations for such applications as signs on vehicles, for awnings, for tensioning wall murals, for tensioning pylon signage (e.g., backlit planar sign structures), for tensioning artist's canvas, for tensioning and framing canvas paintings or other images, and for use on roll-up type doors (e.g., truck rear and/or side roll-up doors). For use in some embodiments (e.g., on roll-type doors), a flexing feature (e.g., stretchable section) is included to allow length and/or width flexing of the planar structure, as needed.

Additional advantages and novel features of the invention will be set forth in part in the description that follows, and in part will become more apparent to those skilled in the art upon examination of the following or upon learning by practice of the invention.

BRIEF DESCRIPTION OF THE FIGURES

FIG. 29 presents an exploded view of the various components of an example assembly, in accordance with an embodiment of the present invention;

FIG. 30 shows components of a variation of the attachable edge for the planar structure, in accordance with an embodiment of the present invention;

FIGS. 31–33 show various aspects of an embodiment of the present invention that includes a planar structure having a flexing feature, for use, for example, with a roll-up door;

FIG. 35 presents example roll-up door application of the present invention to a series of roll-up doors contained in a single structure, in accordance with an embodiment of the present invention; and FIG. 36 shows an example framed canvas or other framed planar structure application of the present invention.

DETAILED DESCRIPTION

References will now be made in detail to embodiments of the present invention, examples of which are illustrated in the accompanying drawings.

Figure 1:
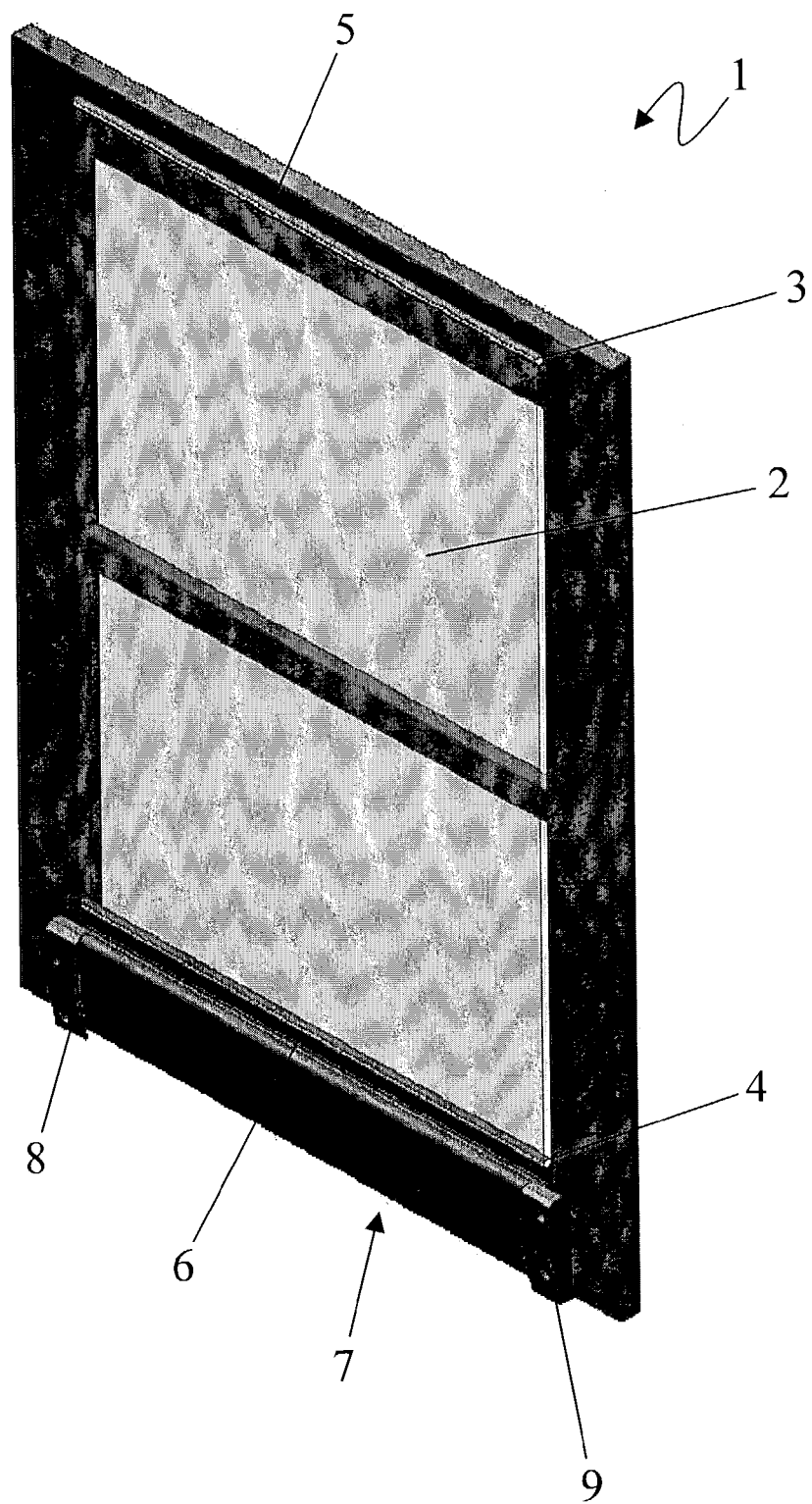
FIG. 1 depicts various features of an example protective awning application of the system in the tensioned state, in accordance with an embodiment of the present invention.

FIG. 1 depicts various features of a planar structure attachment and tensioning system, such as an example protective awning system for use with a window or door for a building, in the tensioned state, in accordance with an embodiment of the present invention. As shown in FIG. 1, the system 1 includes a planar structure portion 2 having an attachable edge top 3 and bottom 4, such as beaded edges. The edge top 3 is, for example, inserted in the fixed open section 5, sometimes referred to herein as a top rail, such as a slotted opening having C-shaped cross-section, and the edge bottom 4 is inserted in the tensioning open section 6 (e.g., also having, for example, a C-shaped cross-section), which is a component of the tensioning mechanism 7 located at the lower end of the system 1, as shown in FIG. 1. The tensioning mechanism 7, once tightened, is further secured in place by end brackets 8, 9.

Figure 2:
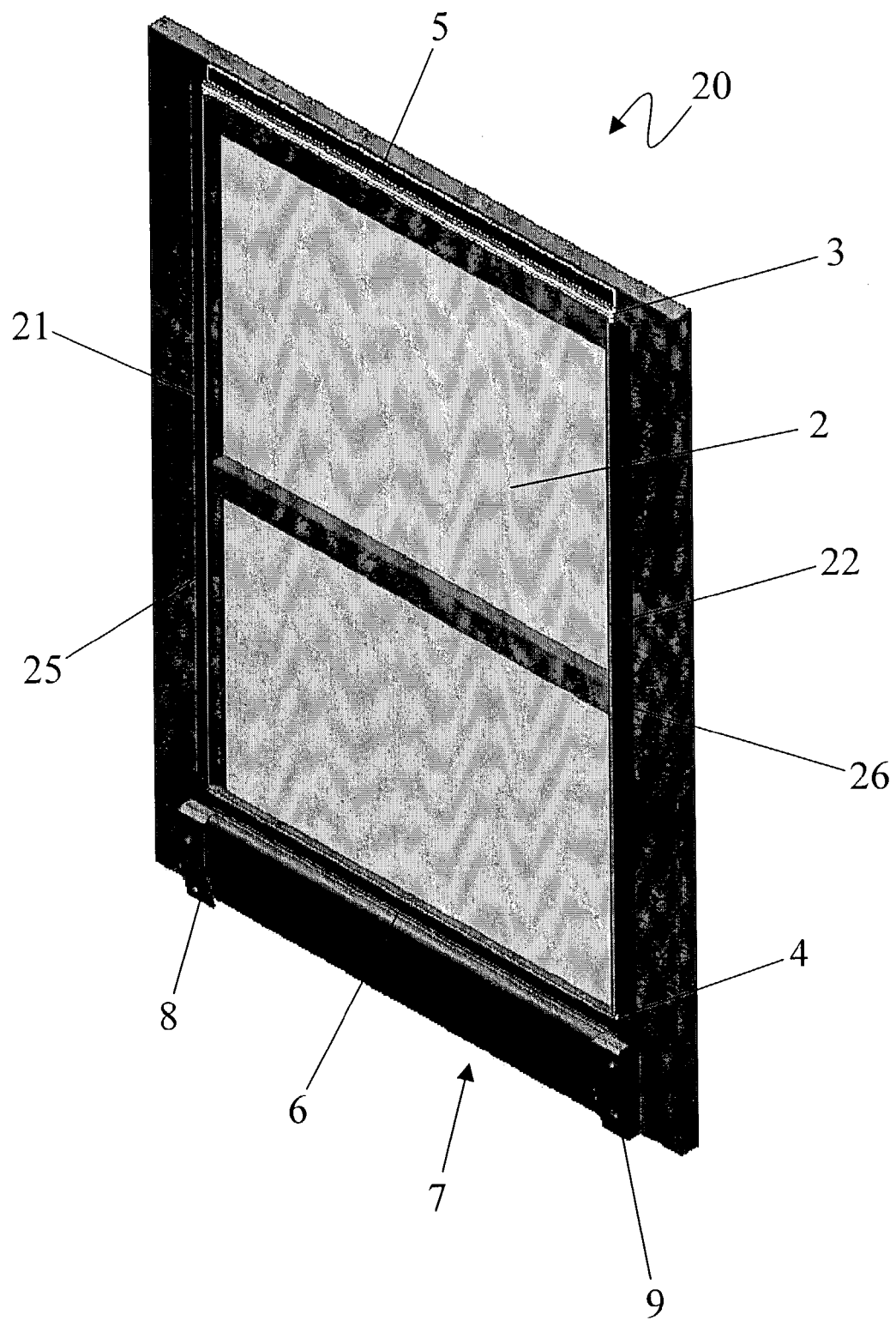
FIG. 2 shows an example protective awning application of the system in the tensioned state, with the additional feature of attachment mechanisms for lateral edges, in accordance with an embodiment of the present invention.

FIG. 2 shows second planar structure attachment and tensioning system, such as a second example protective awning system in the tensioned state, with the additional feature of attachment features for side edges, in accordance with an embodiment of the present invention. As shown in FIG. 2, the example planar structure attachment and tensioning system 20 of this embodiment is similar to that of FIG. 1, but includes the addition of attachable side edges 21, 22, such as beaded edges, and features for securing the planar structure 2 in the lateral direction, as shown in FIG. 2. In one embodiment, as shown in FIG. 2, the attachable side edges 21, 22 are beaded and insertable in fixed open sections 25, 26, respectively, for added securing of the planar structure 2. In another embodiment, the side edges 21, 22, are secured and tensioned in the lateral direction via fixed and tensionable features similar to the horizontal direction tensioning features 5, 6, 7, 8, 9 described further with regard to FIG. 1.

Figure 3:
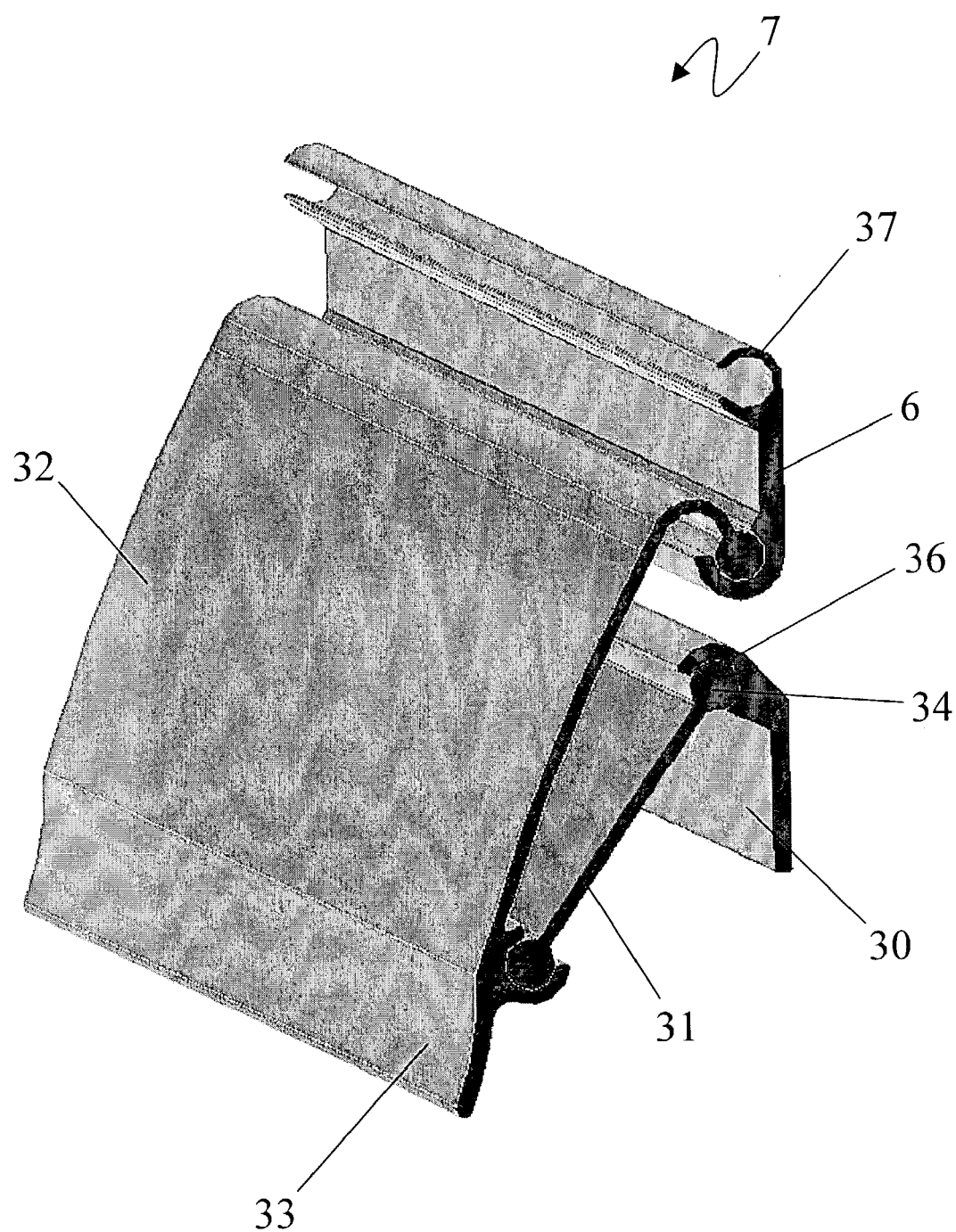
FIG. 3 presents a closeup of aspects of an example tensioning mechanism in a non-tensioned state, in accordance with an embodiment of the present invention.

FIG. 3 presents an example tensioning mechanism in a non-tensioned state, in accordance with an embodiment of the present invention. As shown in FIG. 3, the tensioning mechanism 7 includes a tensioning open section 6, which is moveable (e.g., upwardly and downwardly, as shown in FIG. 3) for receiving the beaded or otherwise attachable edge bottom 4 of the planar structure 2, as shown, for example, in FIGS. 1 and 2. The tensioning mechanism 7 also includes a fixed component 30, such as a component fixed to a building or vehicle, to which a planar structure is to be attached, a beam portion 31, and a lever arm portion 32. Pivotal tensioning of the planar structure 2, as shown in FIG. 2, is produced by tensionably drawing the tensioning open section 6 toward the fixed component 30 via levering of the lever arm 32 and the beam portion 31. For example, downward force, as shown in FIG. 3, is applied to the end 33 of the lever arm 32, causing pivoting of the lever arm 32 and the beam portion 31 about one pivotal end 34 of the beam portion 31 within a slotted portion 36 of the fixed component 30, thereby drawing the movable tensioning open section 6 toward the fixed component 30 and thereby applying a holding and tensioning force to the attached planar structure (e.g., via receipt of a beaded edge of the planar structure in the slotted section 37 of tensioning open section 6, as shown in FIG. 2).

Figure 4:
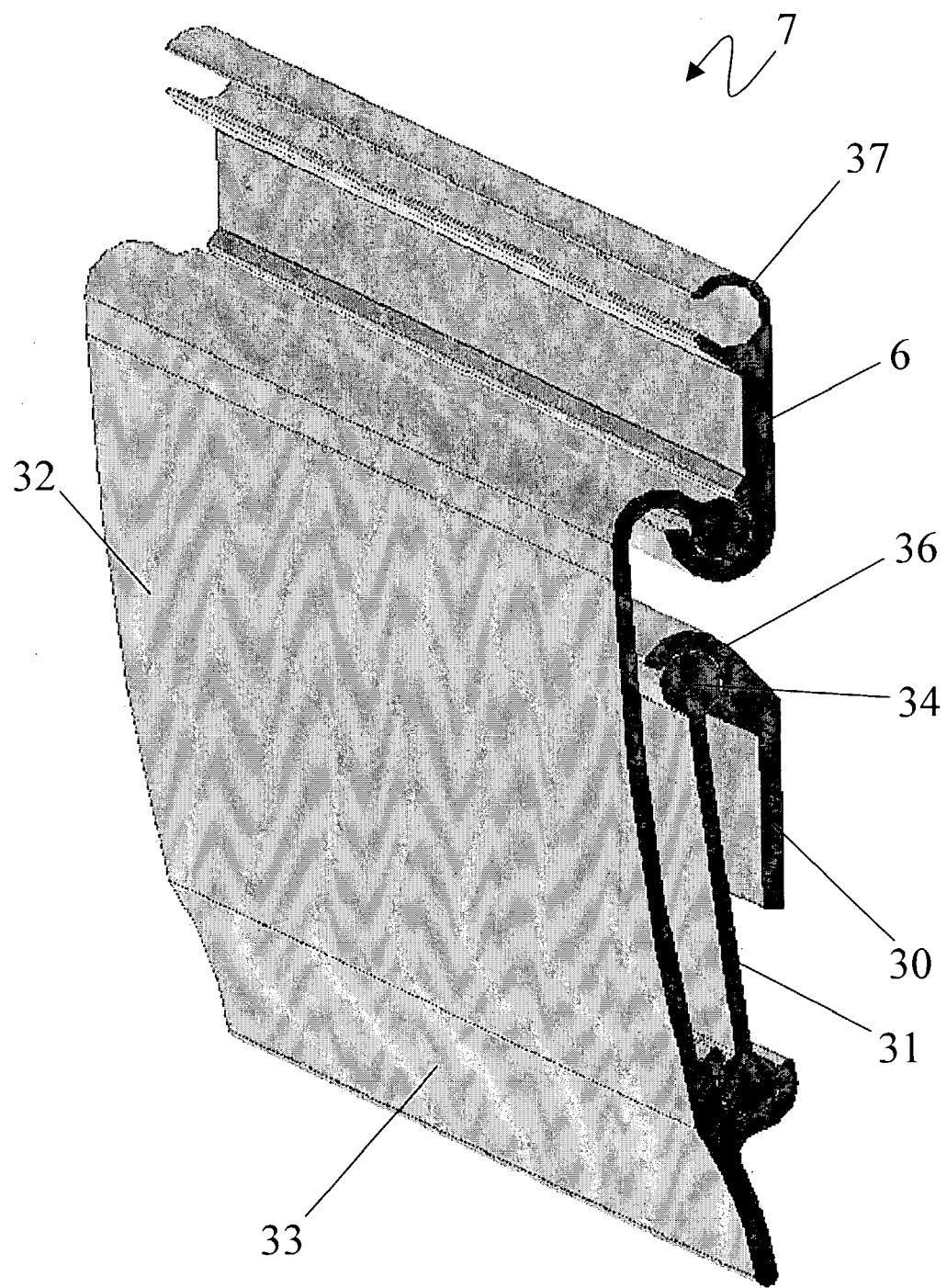
FIG. 4 depicts a closeup of aspects of an example tensioning mechanism in a tensioned state, in accordance with an embodiment of the present invention.

FIG. 4 depicts the example tensioning device of FIG. 3 in a tensioned state, in accordance with an embodiment of the present invention. As shown in FIG. 4, following passage of the end 33 of the lever arm 32 over the slotted portion 36 of the fixed component 30, the tensioning arm 31 becomes locked in the tensioned position and the tensioning mechanism 7 is in a position referred to as "the drum taught position."

Figure 5:
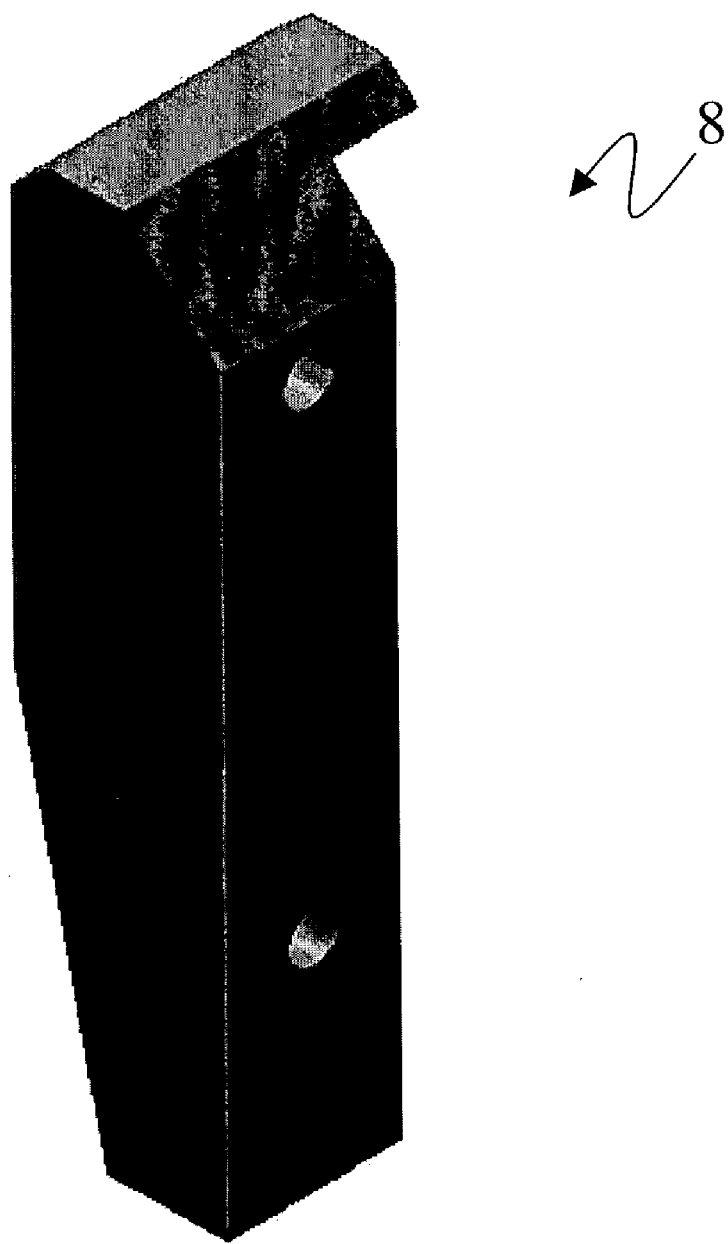
FIG. 5 shows a closeup of an end bracket for covering the ends of a tensioning mechanism, in accordance with an embodiment of the present invention.

FIG. 5 shows a closeup of an example end bracket for covering an end of a tensioning mechanism 7, in accordance with an embodiment of the present invention, as further shown in FIG. 2.

Figure 6:
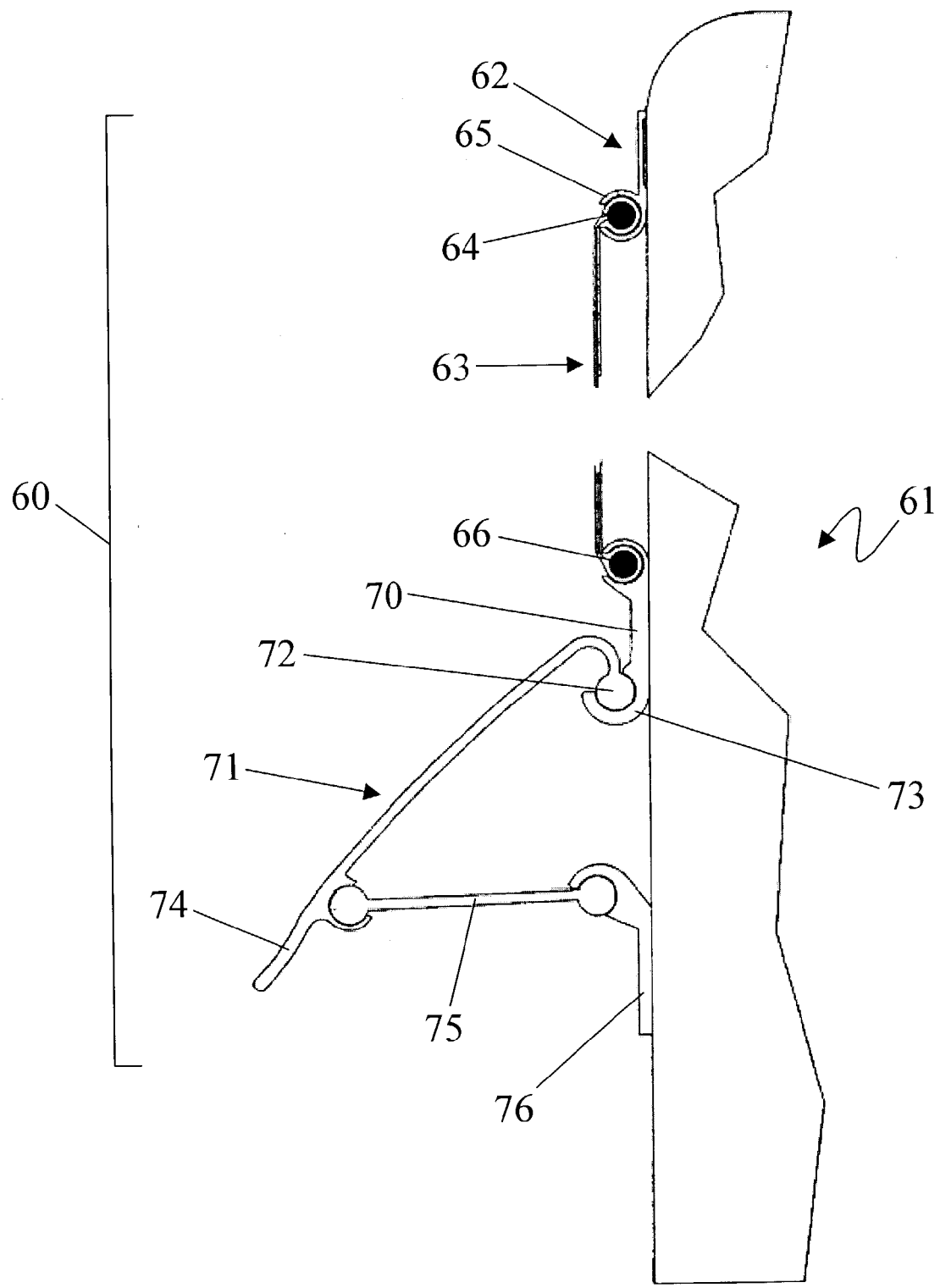
FIG. 6 presents example features of a sign display application of the system in a relaxed, non-tensioned state, in accordance with an embodiment of the present invention.

FIG. 6 presents example features of another embodiment of a planar structure attachment and tensioning system, such as an example sign display system for use with a vehicle, in a relaxed, non-tensioned position. As shown in FIG. 6, the one or more components of the attachment and tensioning system 60 are attached to the surface of an object 61, such as a truck side or other attachment surface. A first fixed component 62 for securing one end of the planar structure 63 (e.g., a sign or other advertising medium) is firmly attached to the surface of the object 61. To attach one end of the planar structure 63 (e.g., upper end, as shown in FIG. 6), for example, the planar structure 63 includes a first beaded edge 64, which is insertable into a slotted feature 65 of the first fixed component, or top rail. 62.

As further shown in the example embodiment of FIG. 6, the end of the planar structure 63 opposite the first beaded edge 64 also has a beaded edge 66, which is introduceable into an open section of moveable portion 70. In one embodiment, the moveable portion 70 is not attached to the surface of the object 61, but is free floating and loaded through a tensioning lever arm 71. One end 72 of the tensioning arm 71 is bent toward and coupled to the moveable portion 70 via a coupling 73 that receives one end of the tensioning lever arm 71. The other end 74 of the tensioning lever arm 71, is coupled to one end of a beam portion 75, which in turn is coupled via, for example, an open trough, to a second fixed open section 76 that is firmly attached to the surface of the object 61.

Figure 7:
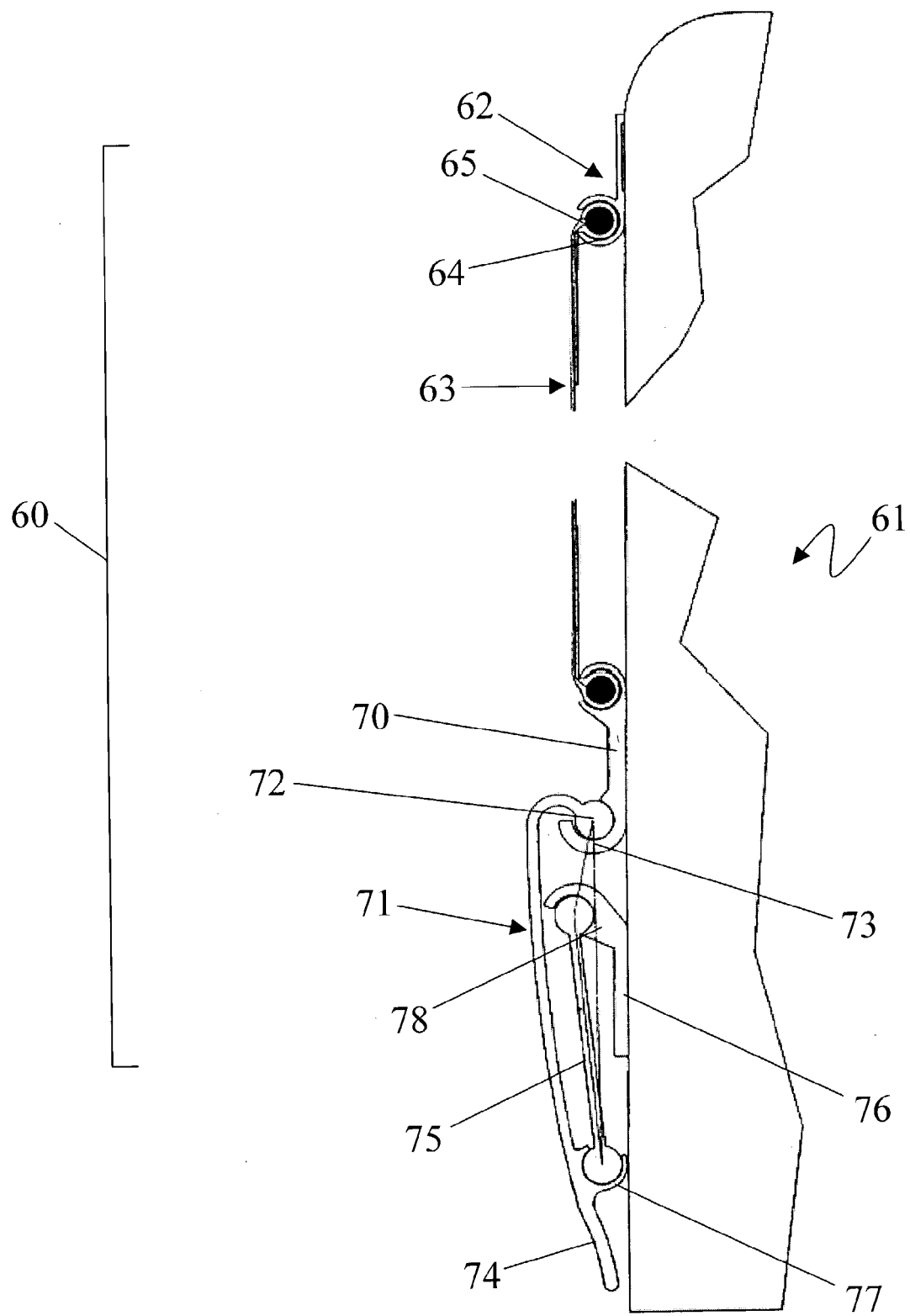
FIG. 7 shows the sign display application of the system of FIG. 6 in the tensioned state.

FIG. 7 shows the planar structure attachment and tensioning system of FIG. 6 in a tensioned state. As shown in the position of FIG. 7, the tensioning lever arm 71 has performed a pivotal rotation within the coupling 73 of the moveable tensioning open section 70. As will be appreciated from FIGS. 6–7, the fact that end 72 of lever arm 71 is bent results in the end of the lever arm maintaining its seat in coupling 73 as lever arm 71 is pivotally rotated. Simultaneously, the tensioning lever arm 71 has caused pivotal rotation of the beam portion 75 about both the coupling 77 of the tensioning lever arm 71 and the coupling 78 of the second fixed open section 76. Once the end portion 74 of the tensioning lever arm 71 has passed over the center of the beam portion 75, as shown in FIG. 7, the tensioning lever arm 71 becomes locked in a tensioned position and the planar surface 63 is in "the drum taught position." (e.g., a sign or other advertising medium) is firmly attached to the surface of the object 61. To attach one end of the planar structure 63 (e.g., upper end, as shown in FIG. 6), for example, the planar structure 63 includes a first beaded edge 64, which is insertable into a slotted feature 65 of the first fixed component 62.

As further shown in the example embodiment of FIG. 6, the end of the planar structure 63 opposite the first beaded edge 64 also has a beaded edge 66, which is introduceable into an open section of moveable portion 70. In one embodiment, the moveable portion 70 is not attached to the surface of the object 61, but is free floating and loaded through a tensioning lever arm 71. One end 72 of the tensioning arm 71 is coupled to the moveable portion 70 via a coupling 73 that receives one end of the tensioning lever arm 71. The other end 74 of the tensioning lever arm 71, is coupled to one end of a beam portion 75, which in turn is coupled via, for example, an open trough, to a second fixed open section 76 that is firmly attached to the surface of the object 61.

FIG. 7 shows the planar structure attachment and tensioning system of FIG. 6 in a tensioned state. As shown in the position of FIG. 7, the tensioning lever arm 71 has performed a pivotal rotation within the coupling 73 of the moveable tensioning open section 70. Simultaneously, the tensioning lever arm 71 has caused pivotal rotation of the beam portion 75 about both the coupling 77 of the tensioning lever arm 71 and the coupling 78 of the second fixed open section 76. Once the end portion 74 of the tensioning lever arm 71 has passed over the center of the beam portion 75, as shown in FIG. 7, the tensioning lever arm 71 becomes locked in a tensioned position and the planar surface 63 is in "the drum taught position."

In accordance with one embodiment of the present invention, installation of the present invention on a vehicle, such as a truck or other vehicle to which a sign or other planar structure is to be attached, will now be described in accordance with FIGS. 8–24.

Figure 8:
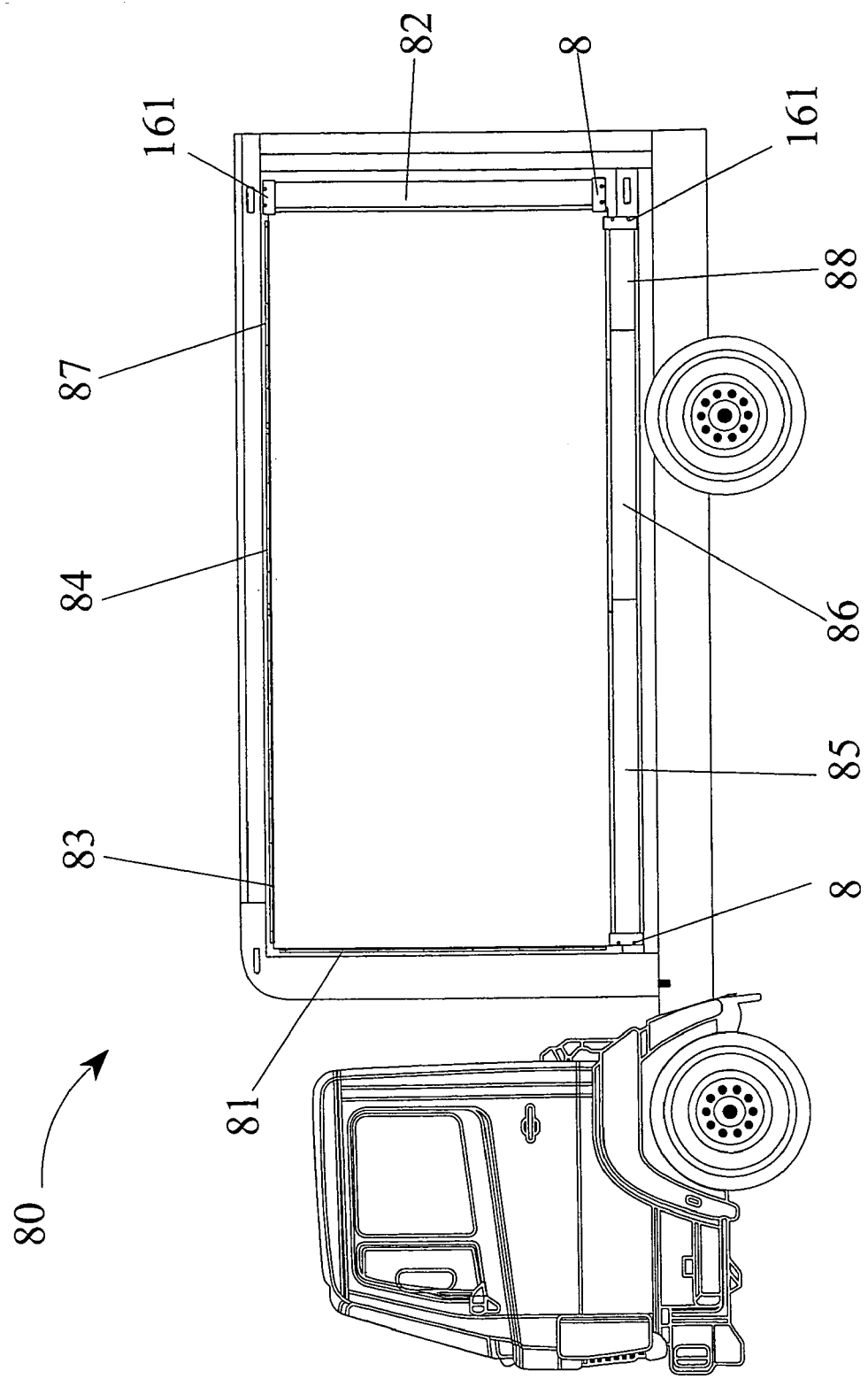
FIG. 8 is an overview of attachment locations for a vehicle application of the system, in accordance with an embodiment of the present invention.

FIG. 8 shows an example overview figure of a vehicle 80 with attachment locations 81, 82, 83, 84, 85, 86, 87, 88, also referred to interchangeably herein as "extrusion attachment locations," for attaching a planar structure, such as sign, in accordance with an embodiment of the present invention.

Figure 9:
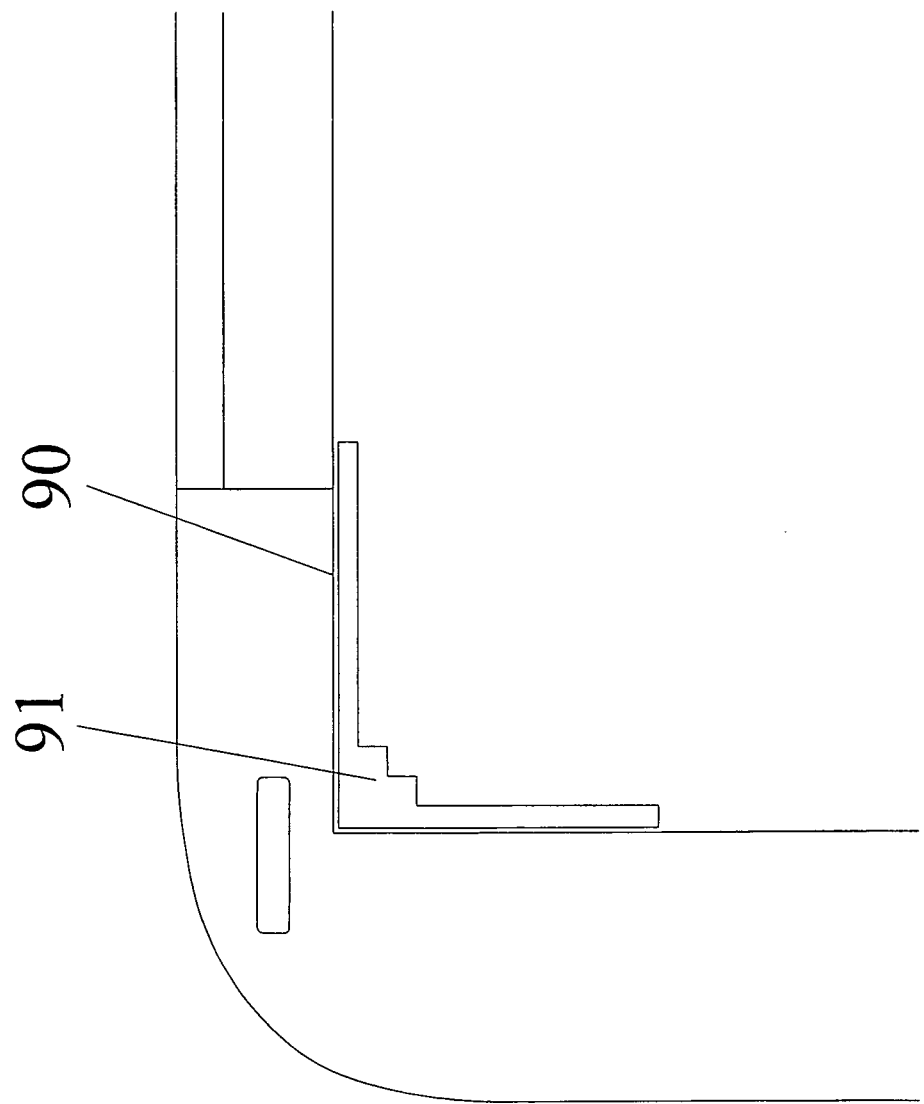
FIG. 9 shows a corner emplaced template for use for installation of the system on a vehicle, in accordance with an embodiment of the present invention.
Figure 10:
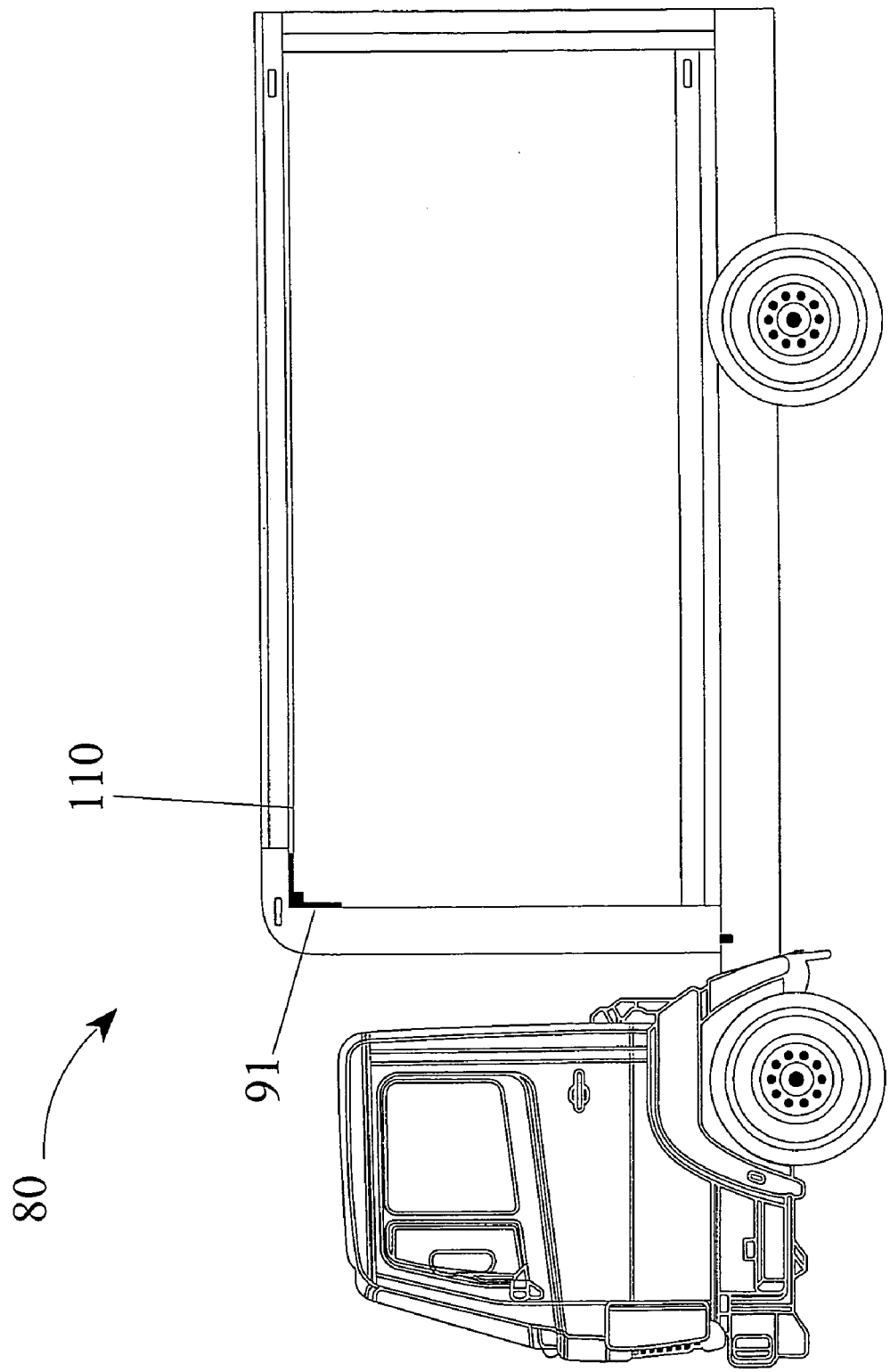
FIG. 10 presents another view of the corner template for use in vehicle application of the system, in accordance with an embodiment of the present invention.
Figure 11:
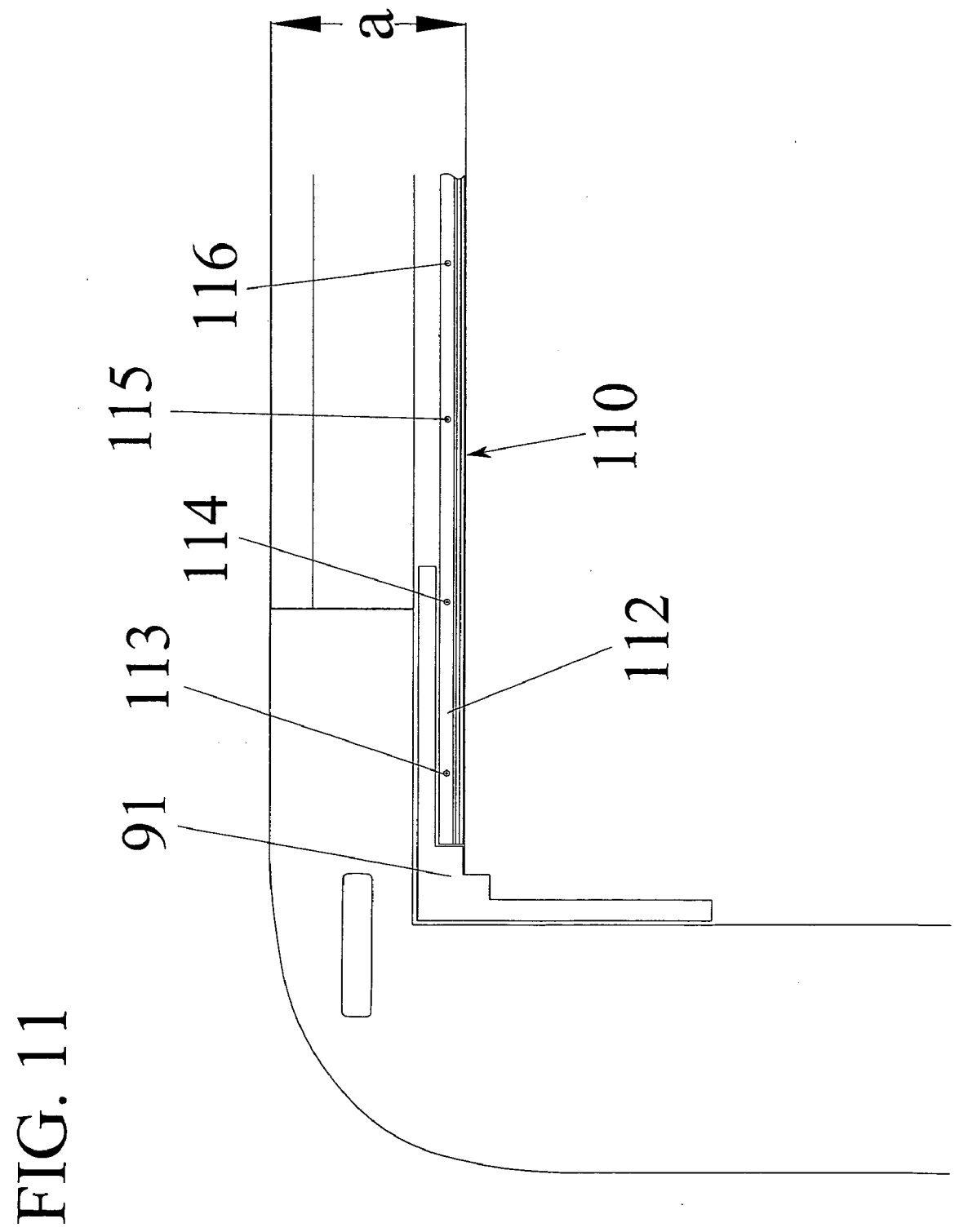
FIG. 11 is a closeup of the template and a horizontal fixed extrusion placement, for use in an example vehicle application, in accordance with an embodiment of the present invention.

As shown in FIGS. 9–11, along a top portion 90 of the vehicle 80, a template 91 is placed in one corner of vehicle frame (e.g. upper edge at truck cab end). The template 91 is set tightly against the vehicle frame edge location, and the template 91 is temporarily secured in place (e.g., taped).

As shown in FIGS. 10 and 11, a chalk line 110 is made from the template to a second location on the vehicle (e.g., the back of truck), maintaining the proper offset a from the vehicle edge 111, as shown in FIG. 11. A first fixed portion 112, such as a top rail extrusion, as shown in FIG. 11, is fittably placed against the template 91, and the chalk line 110 is used as a guide.

Figure 12:
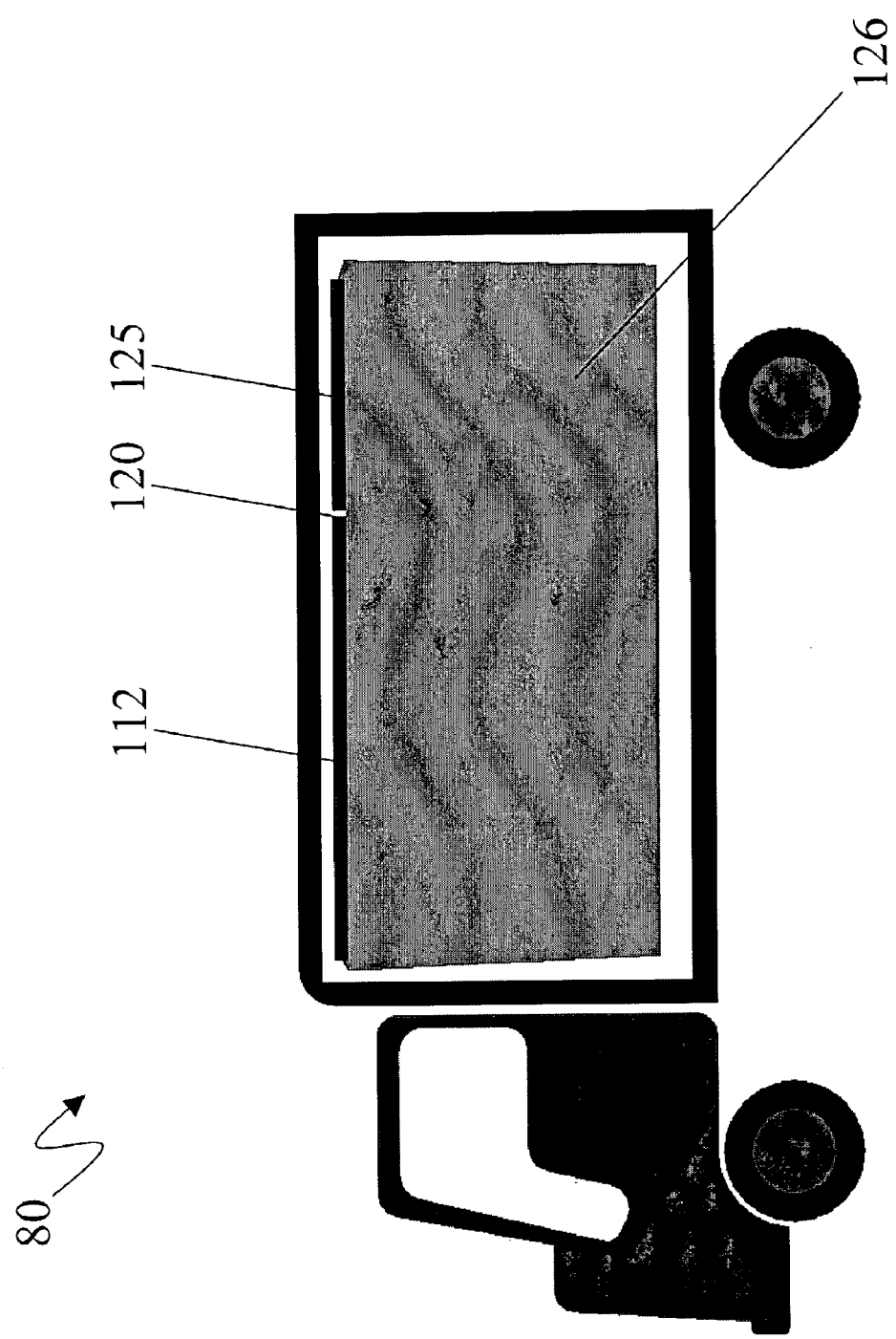
FIG. 12 shows an overview of an attached horizontal extrusion and hanging planar structure, for use in an example vehicle application, in accordance with an embodiment of the present invention.

Starting near the template 91, pilot holes 113, 114, 115, 116 are drilled, and the first fixed portion 112 is secured (e.g., riveted or bolted) in place to the vehicle 80 along each successive pilot hole 113, 114, 115, 116, such that the edge of the first fixed portion 112 follows the chalk line 110. Alternatively to securing via pilot holes, other attachment devices and methods known in the art may be used to secure the fixed portion 112 (e.g., adhesion; welding). In one embodiment, if the truck has a less than a predetermined length (e.g., 16 feet trailer length), one or two such fixed portions 112 (e.g., two 8 foot portions) are used. In another embodiment, if the trailer length is more than the predetermined length, starting at the end 120 of first fixed portion 112, as shown in FIG. 12, one or more abutting additional fixed portions 125 are aligned with the chalk line 110 and similarly secured via pilot holes and attachments or other securing mechanism so as to match the trailer length. Shorter sections are likewise usable with shorter length trucks.

As further shown in FIG. 12, once the fixed portions, or top rail, 112, 125 are attached, the planar structure 126 (e.g., sign) is attached to the fixed portions 112, 125, such as by feeding an upper beaded edge of the planar structure 126 into slotted portions of the fixed portions 112, 125. As shown in FIG. 12, the planar structure 126 is thus able to hang via the fixed portions 112, 125.

Figure 13:
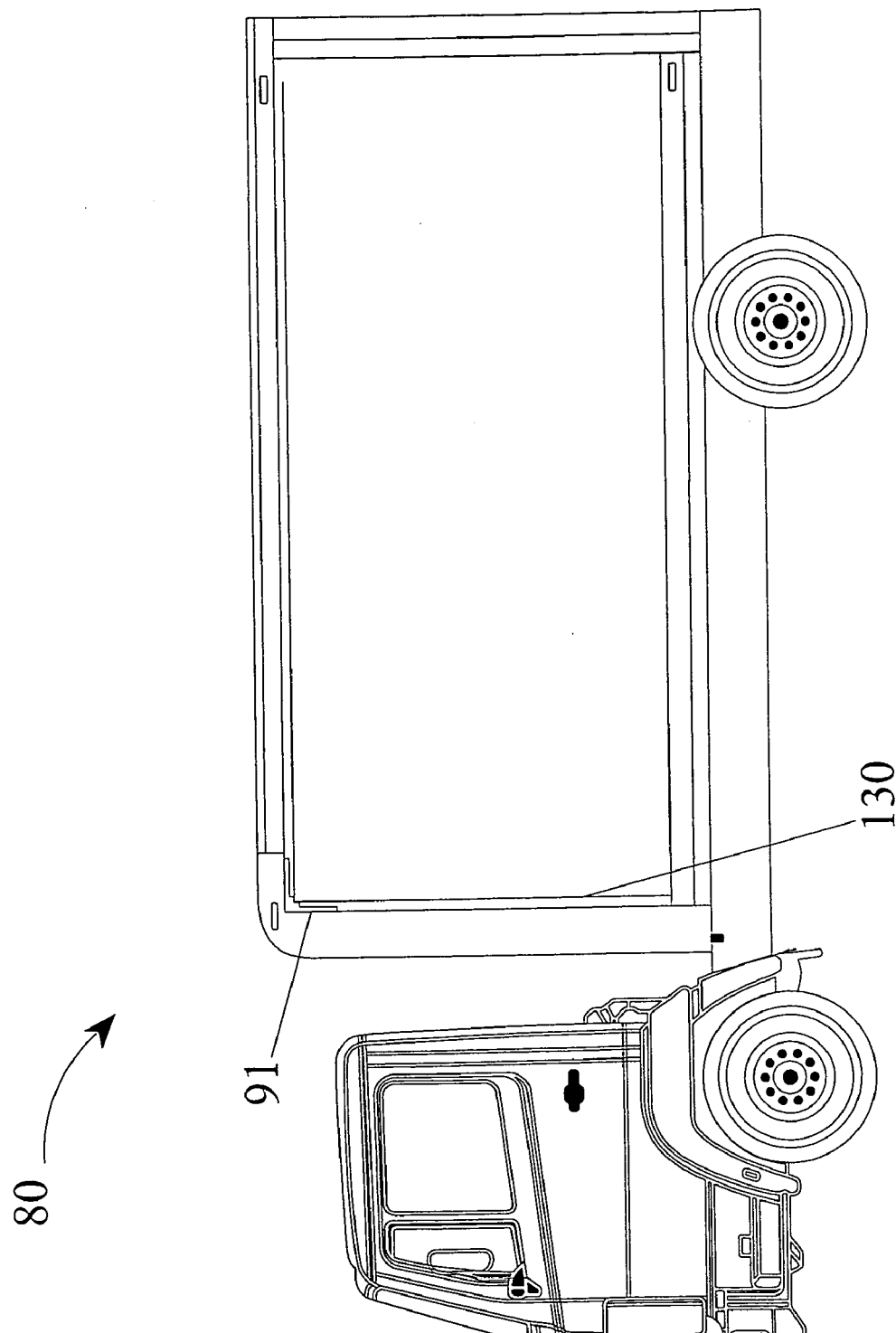
FIG. 13 presents a closeup of the template and vertical fixed extrusion placement, for use in an example vehicle application, in accordance with an embodiment of the present invention.
Figure 14:
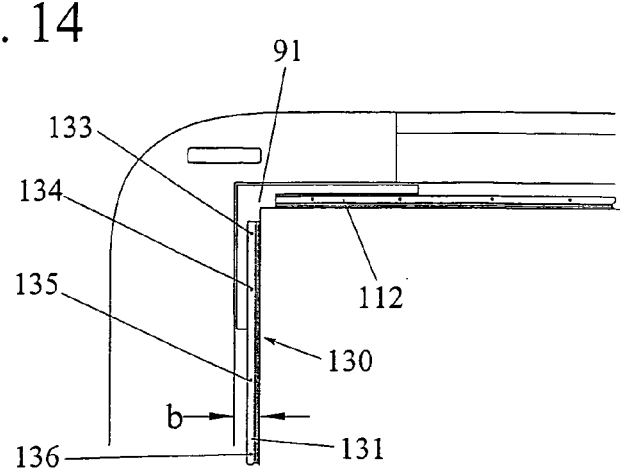
FIG. 14 presents a closeup of the template, horizontal fixed extrusion placement, and vertical fixed extrusion placement, for use in an example vehicle application, in accordance with an embodiment of the present invention.

In one embodiment of the present invention, a vertical chalk line 130 is then made from the template 91 to the bottom of vehicle side, maintaining the proper offset from the vehicle frame b, as shown in FIGS. 13 and 14. A portion coupleable to a planar structure side 131 (e.g., vertical side extrusion) is then fittably placed against the template 91, and the vertical chalk line 130 is used as a guide.

The side coupleable portion 131 is then attached to the vehicle 80. For example, starting near the template 91, pilot holes 133, 134, 135, 136 are drilled, and the side coupleable portion 131 is secured (e.g., riveted or bolted) in place along each successive pilot hole 133, 134, 135, 136, such that the edge of the portion 131 follows the chalk line 130.

Figure 15:
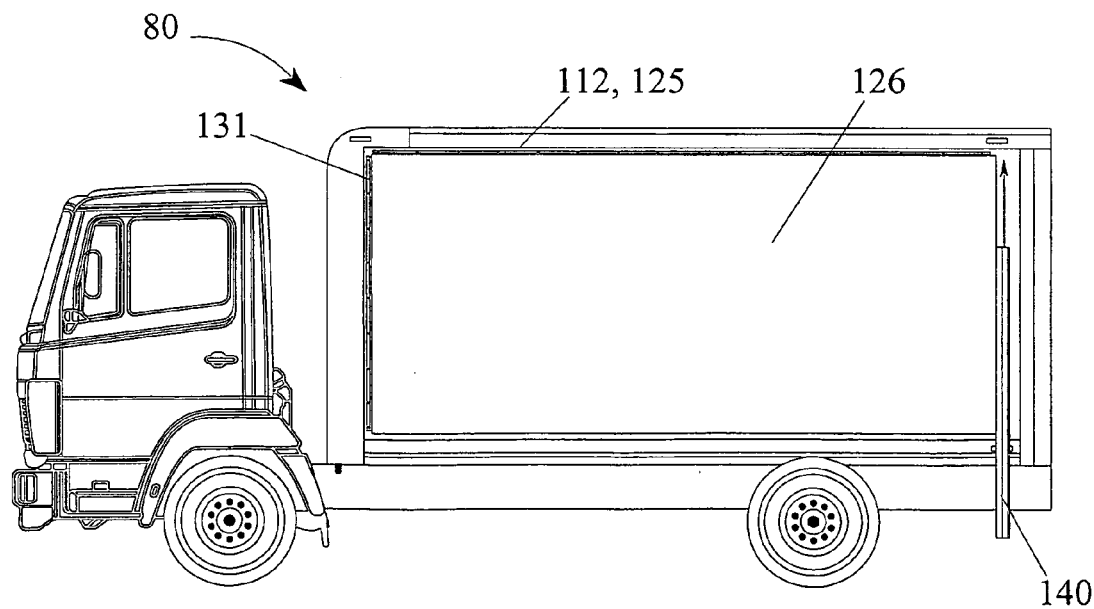
FIG. 15 shows a view of placement for a first floating extrusion for use in an example vehicle application, in accordance with an embodiment of the present invention.

A floating side rail, side moveable portion 140 (e.g., floating vertical extrusion), is then attached to the planar structure 126, such via slidably coupling to the beaded lateral edge of the planar structure 126, at the opposite side of the planar structure 126 from the fixed side coupleable portion 131, as shown in FIG. 15. The floating side rail, or side moveable portion, 140 is temporarily secured in place to the planar structure 126, such as via a hand clamp.

Figure 16:
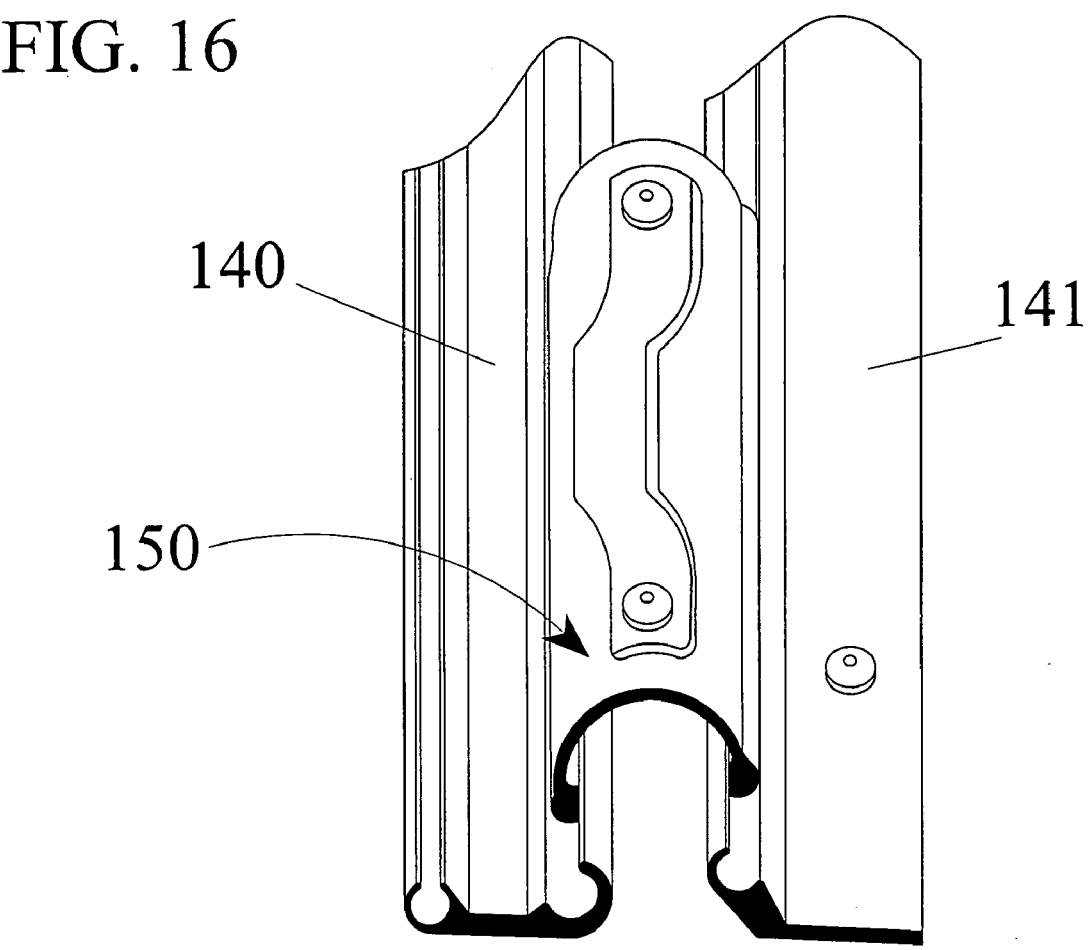
FIG. 16 presents a spacing tool with a floating extrusion and a spaced vertical fixed extrusion, for use in an example vehicle application, in accordance with an embodiment of the present invention.
Figure 17:
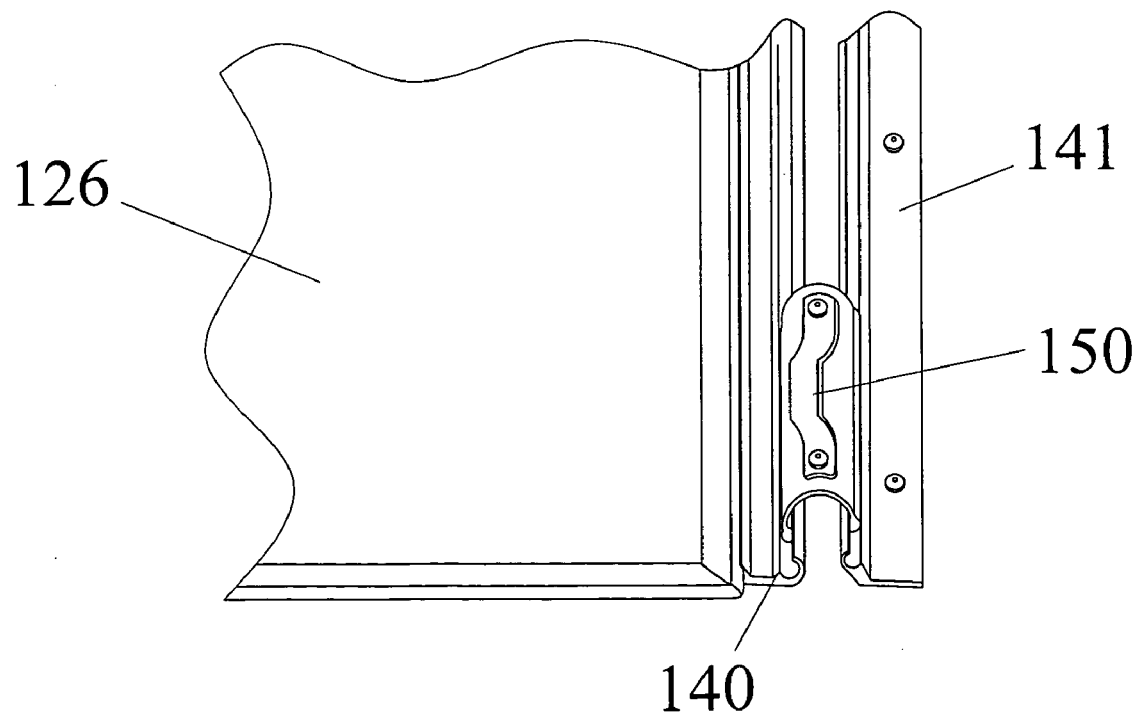
FIG. 17 is a view of placement of fixed and floating vertical extrusions using a spacing tool, in accordance with an embodiment of the present invention.
Figure 18:
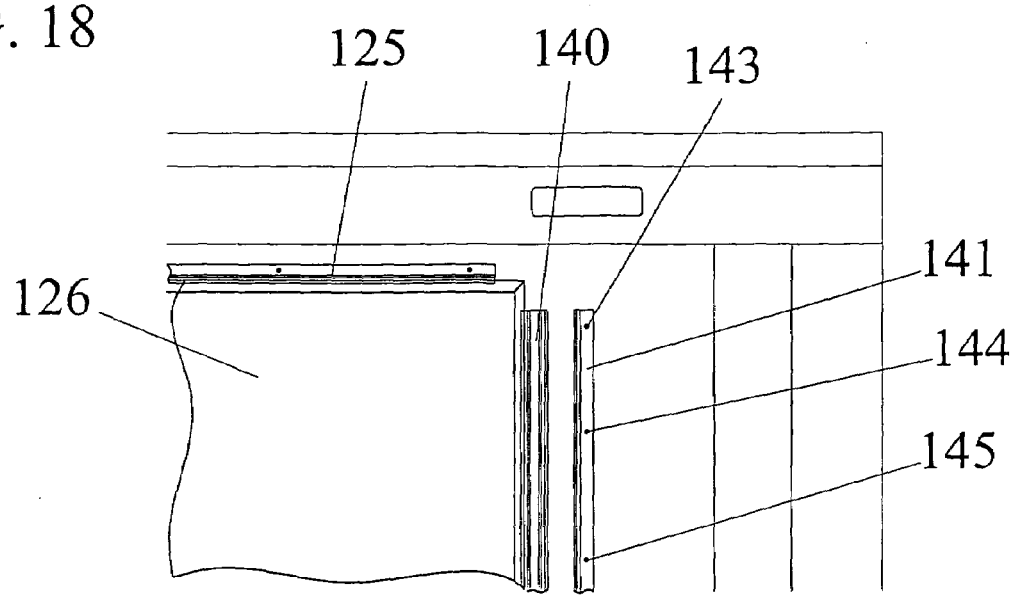
FIG. 18 shows a closeup of emplaced fixed horizontal and vertical extrusions, and a positioned floating vertical extrusion, in accordance with an embodiment of the present invention.

A spacing block 150, such as a tensioning tool, as shown in FIG. 16, is then used to position a second fixable side portion 141 (e.g., second vertical extrusion) to allow marking of location marks for securing the fixable side portion 141, as further shown in FIG. 17. The fixable side portion 141 is then attached to the planar structure 126, as shown in FIG. 18. For example, starting near the template 91, pilot holes 143, 144, 145 are drilled, and the fixable side portion 141 is secured (e.g., riveted or bolted) in place along each successive pilot hole 143, 144, 145, as shown in FIG. 18.

Figure 19:
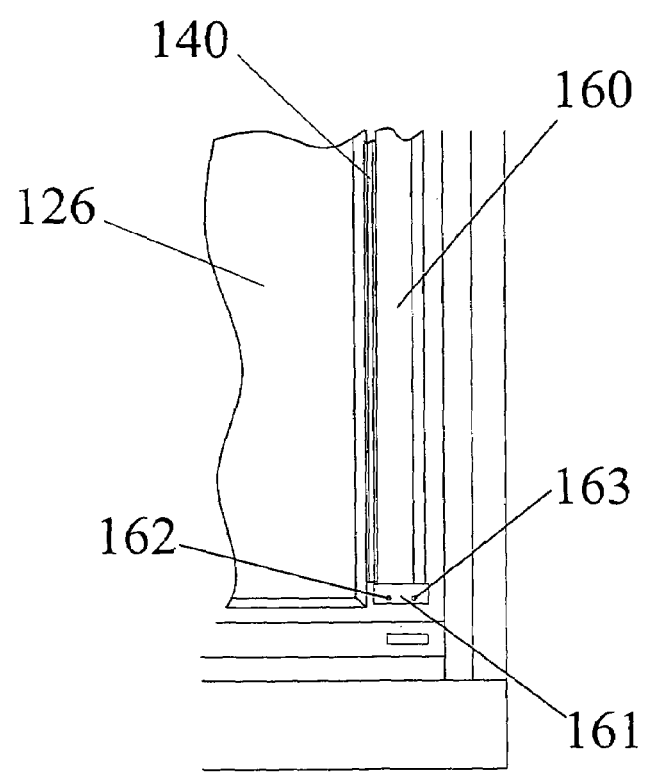
FIG. 19 contains an overhead view of an example pivot arm and lever mechanism, floating extrusion, and end cap, in accordance with an embodiment of the present invention.

As shown in FIG. 19, an extrusion pivot arm and lever mechanism 160 is then positioned and attached between the side moveable portion 140 and the fixed side portion 141 (note that the attachment and functionality of the pivot arm and lever mechanism 160 of this embodiment is similar to that described above with regard the beam portion 31 and lever arm portion 32 of the device shown in FIGS. 3 and 4), tensionably locked in place, and, optionally, one or more end caps 161 are installed (e.g., at the top and bottom of the pivot arm and lever mechanism 160). In one embodiment, at least one end cap 161 is preferably used at the bottom end of a vertical extrusion pivot arm and lever mechanism 160 so as also to prevent or reduce sliding of any vertical components of the system.

In one embodiment, the end cap 161 includes installation openings 162, 163 for receiving securing features (e.g., rivets or bolts). To secure the end cap 161 in place, the vehicle 80 is marked for the location of the securing features while the end cap 161 is temporarily in place, and, following the drilling of appropriate holes in the vehicle 80, the end cap 161 is installed and secured in place to the vehicle.

Figure 20:
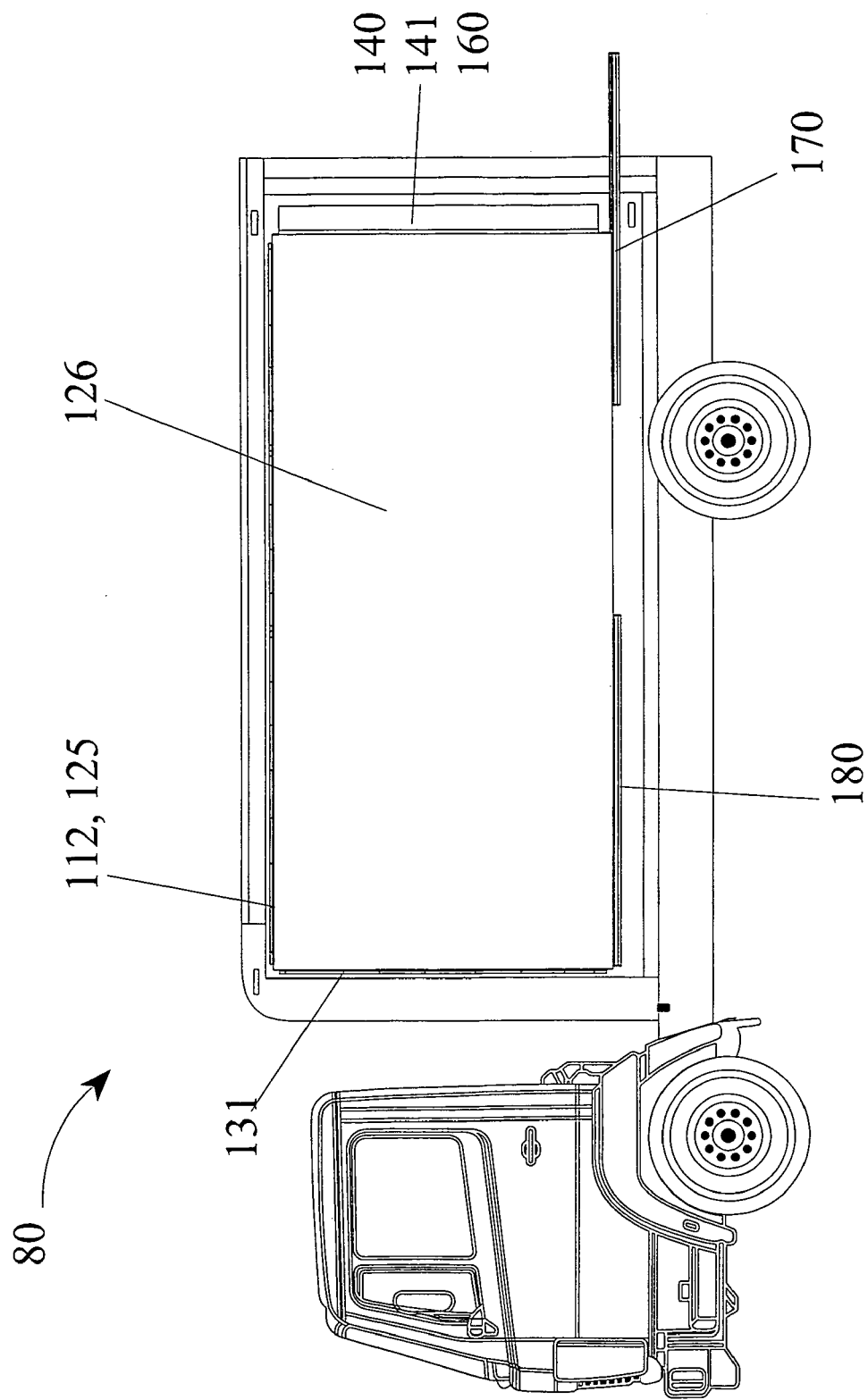
FIG. 20 is an overview of placement of floating horizontal extrusions for an example vehicle use, in accordance with an embodiment of the present invention.
Figure 21:
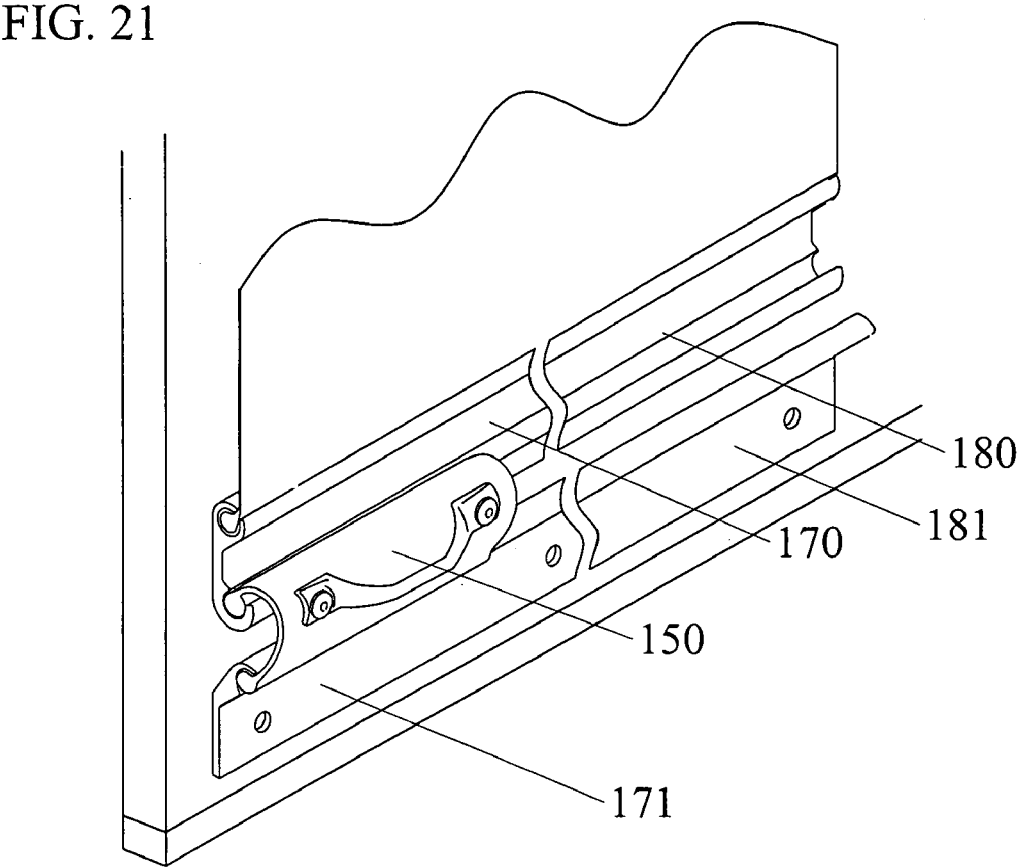
FIG. 21 presents a closeup view of use of a spacing tool for placement of a fixed horizontal extrusion relative to an emplaced floating horizontal extrusion, in accordance with an embodiment of the present invention.
Figure 22:
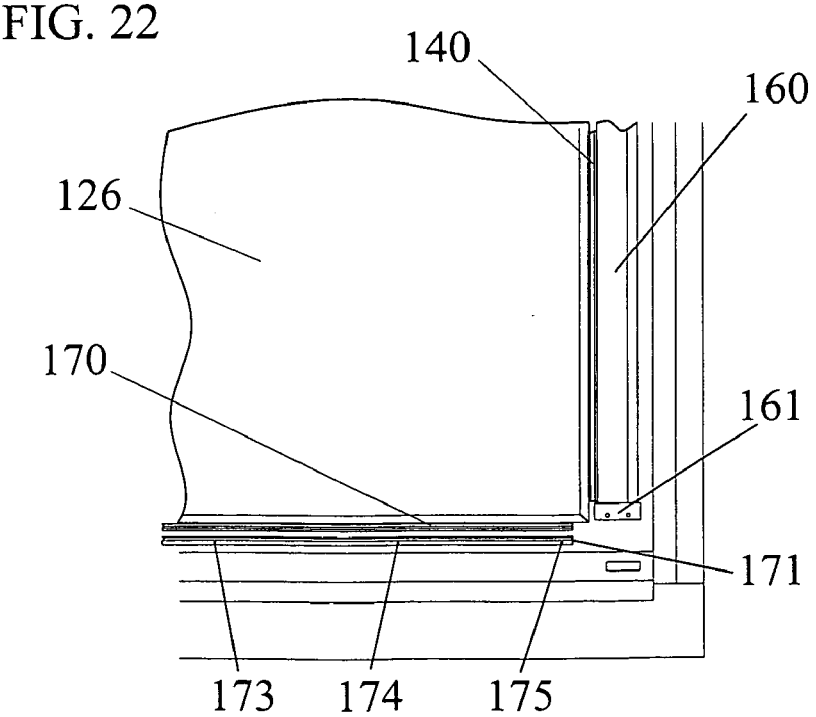
FIG. 22 shows horizontal and vertical extrusions, a pivot arm and lever mechanism, and installed end cap, for use in an example vehicle application, in accordance with an embodiment of the present invention.

As shown in FIGS. 20–22, the bottom attachment portions for the planar structure 126 are then installed, similarly to as described above with regard to FIGS. 15–18. One or more floating bottom rail portions, or bottom moveable portions 170, 180 (e.g., floating vertical extrusions)1 are then attached to the planar structure 126, such via slidably coupling to the beaded bottom edge of the planar structure 126, at the bottom side of the planar structure 126, as shown in FIG. 20.

A spacing block, such as the tensioning tool 150 shown in FIG. 16, is used to position one or more fixable bottom portions 171 (e.g., fixed extrusion) to allow marking of location marks for securing the fixable bottom portion 171. The bottom portion 171 is then attached to the planar structure 126. For example, pilot holes 173, 174, 175 are drilled, and the bottom portion 171 is secured (e.g., riveted or bolted) in place along each successive pilot hole 173, 174, 175.

A second pivot arm and lever mechanism is then positioned and attached between the moveable portion or portions 170, 180 and the fixed portion 171 (note that the attachment and functionality of the pivot arm and lever mechanism of this embodiment is similar to that described above with regard the beam portion 31 and lever arm portion 32 of the device shown in FIGS. 3 and 4), tensionably locked in place, and, optionally, one or more end caps are installed (e.g., at each end of the pivot arm and lever mechanism), similar to as described with regard to FIG. 19, above.

In one embodiment for use with vehicles exceeding the predetermined maximum length for the extrusions (e.g., 16 feet), similar maximum length sections of pivot arm and lever mechanism are used. However, rather than aligning the pivot arm and lever mechanism sections, these sections are overlappingly coupled, so as to link the separate lengths of pivot arm and lever mechanism together.

Figure 23:
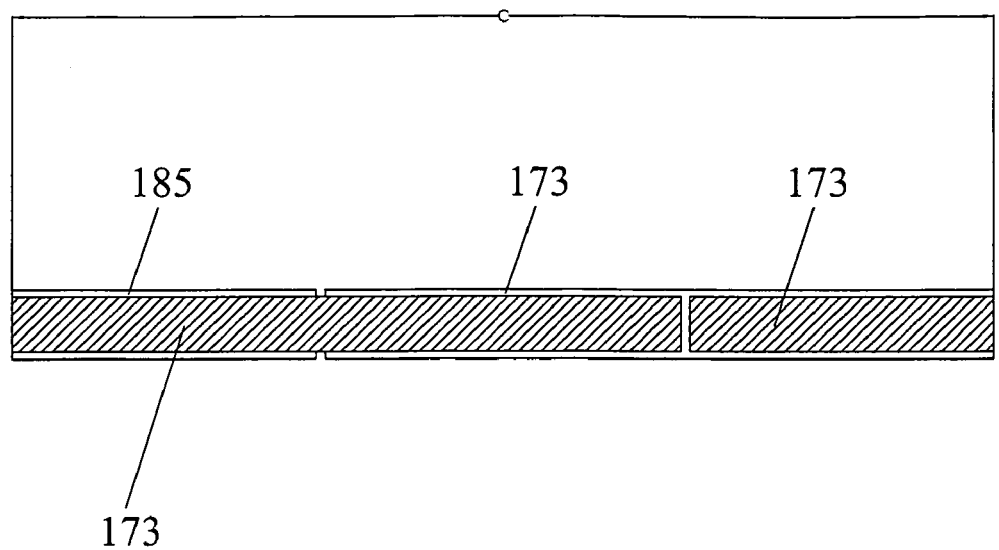
FIG. 23 is a view of abutting different length pivot arm and lever mechanisms, in accordance with an embodiment of the present invention.

For example, as shown in FIG. 23, first horizontal pivot arm portion 185, second horizontal pivot arm portion 186, first lever arm portion 190, and second lever arm portion 191 are positioned so as to overlap, as indicated. In the example shown in FIG. 23, abutted first horizontal pivot arm portion 185 (of "X length," as indicated) and second horizontal pivot arm portion 186 (of "Y length," as indicated) together have a combined length c, while first lever arm portion 190 (of "X length," as indicated) and second lever arm portion 191 (of "Y length," as indicated) also together have a combined length c. However, as shown in FIG. 23, rather than aligning the abutting edges between both the pivot arm portions 185, 186 and the lever arm portions 190, 191, the abutting portions are staggered, as indicated.

Figure 24:
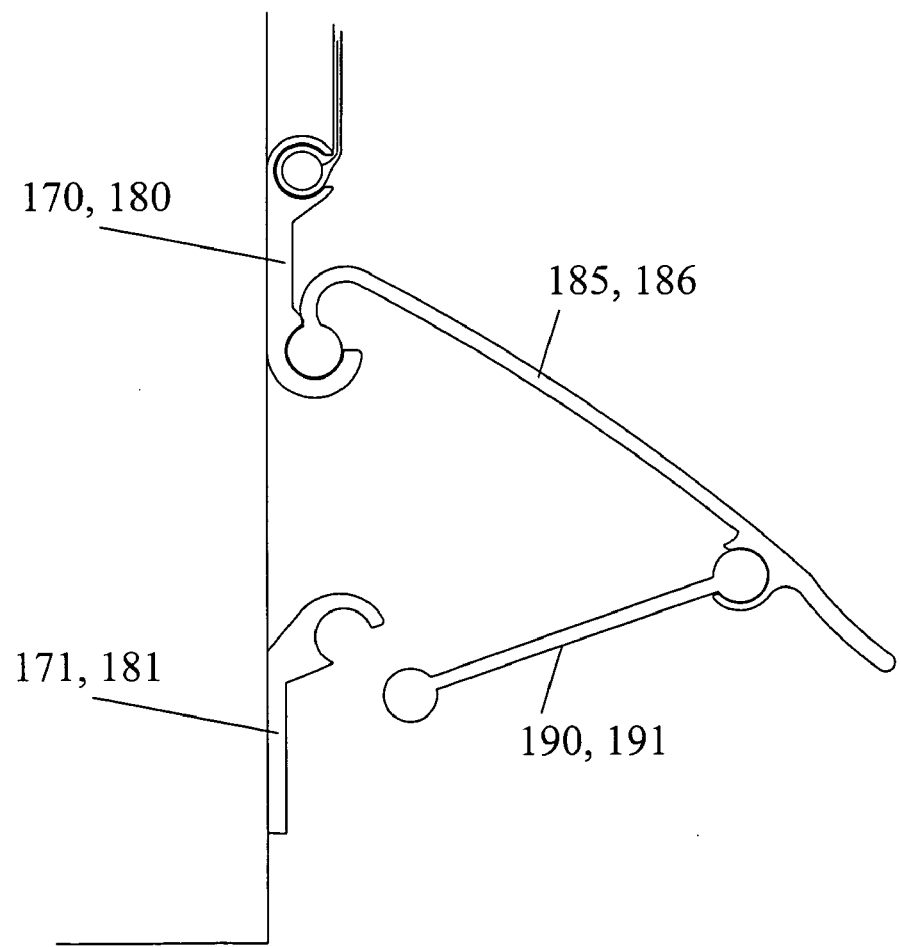
FIGS. 24–26 present end views of the extrusion and lever arm/pivot arm mechanism in partially assembled, unlocked assembled, and locked assembled positions, respectively, in accordance with an embodiment of the present invention.
Figure 25:
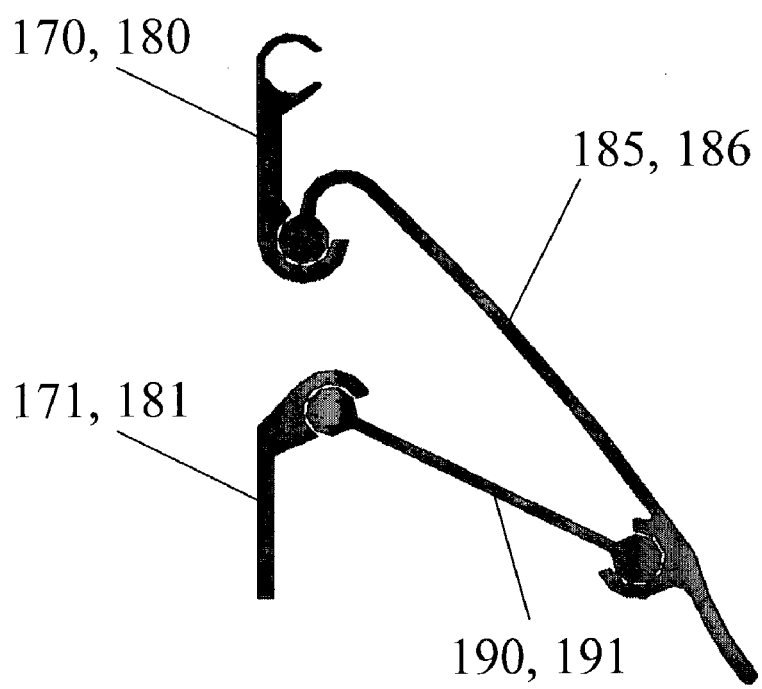
Figure 26:
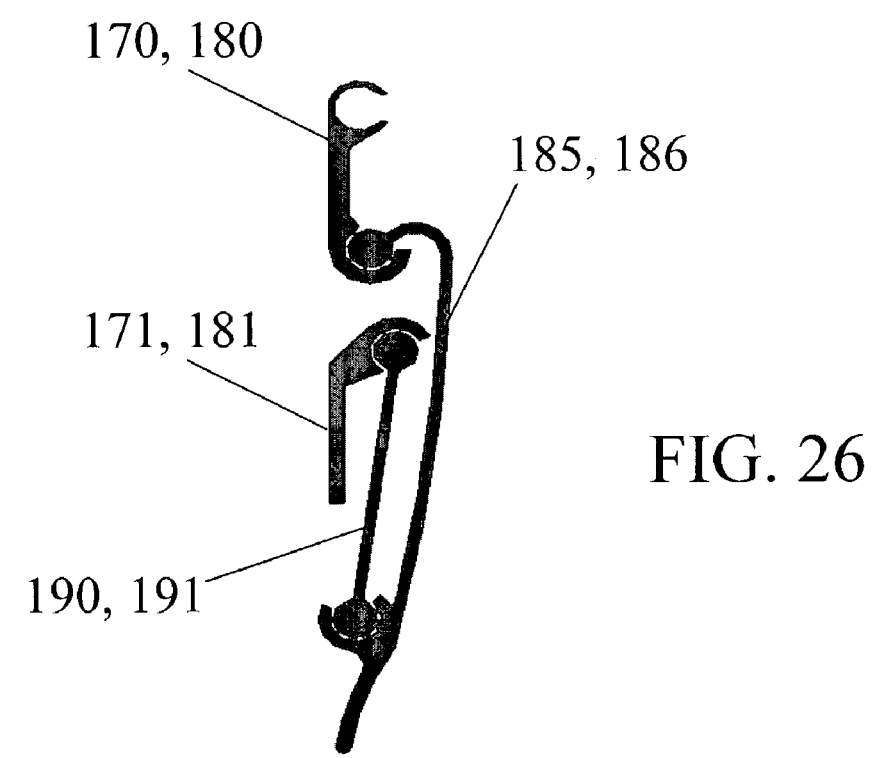

FIGS. 24–26 present end views of the extrusion and lever arm/pivot arm mechanism in partially assembled, unlocked assembled, and locked assembled positions, respectively, with floating extrusions 170, 180, and fixed extrusions 171, 181 shown abutted in the positions indicated. Pivot arm portions 185, 186 are abutted at a staggered abutted position from the lever arm portions 190, 191. Because the pivot arm portions 185, 186 and lever arm portions 190, 191 are abutted at staggered points and coupleably linked, the pivot arm portions 185, 186 and lever arm portions 190, 191 function together as a unit when operated (e.g., when used to tension and lock planar structure, similarly to as discussed above, for example, with regard to FIG. 19 above).

Figure 27:
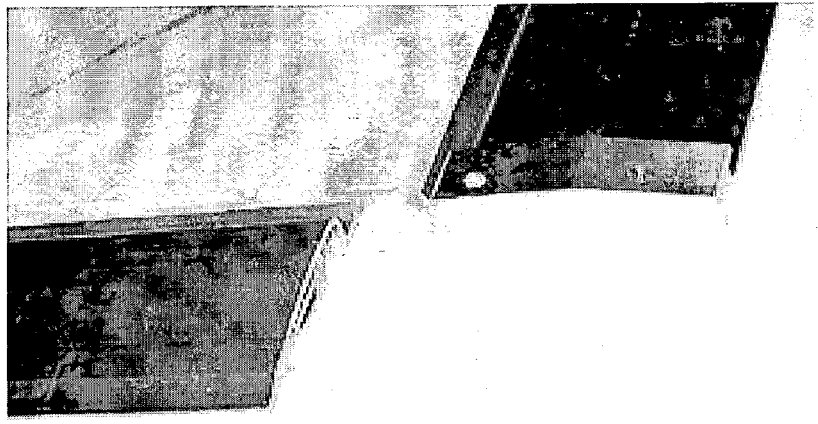
FIGS. 27 and 28 show photostats of end portions of assemblies, in accordance with an embodiment of the present invention.
Figure 28:
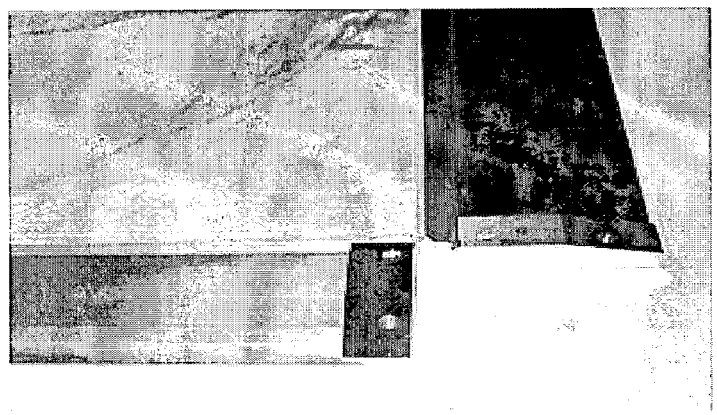

FIGS. 27 and 28 show photostats of end portions of assemblies, in accordance with an embodiment of the present invention.

FIG. 29 presents an exploded view of the various components of an example assembly, in accordance with an embodiment of the present invention.

FIG. 30 shows components of a variation of the attachable edge for the planar structure, in accordance with an embodiment of the present invention. As shown in FIG. 30, in this embodiment, the planar structure 300 includes a semi-enclosing portion 301, such as a sleeve, for receiving an insertion member 305, such as a rigid cylinder. Upon insertion, the insertion member 305 and the semi-enclosing portion 301 together form a rigid edge of the planar structure 300 usable with the present invention similarly to as described with regard to the edge top (e.g., beaded edge), shown, for example, in FIGS. 1 and 2. In one embodiment, the semi-enclosing portion 301 is formed in conjunction with a flap portion 302. In one embodiment the flap 302 is attached (e.g., sewn; adhered) to the surface of the planar structure 300. In another embodiment, the flap portion 302 frictionally held against the planar structure 300.

FIGS. 31–34 show various aspects of an embodiment of the present invention that includes a planar structure having a flexing feature, for use, for example, with a roll-up door. FIG. 31 presents an overview of a structure 310 having a roll-up door, such as a truck with a roll-up rear door, to which the planar structure 311 is attached (e.g., flexible sign or other image). As further shown in the closeup of the lower portion of an exemplary planar structure 311, in accordance with this embodiment, which is presented in FIG. 32, the planar structure 311 has a stretchable section 312 (e.g., a rubber end section), that allows the planar structure 311 to stretch, such as when the planar structure 311 becomes stretched while the roll-up door is being rolled (e.g., passage of the door sections over the rolling portion causes stretching of the attached planar structure 311), and to return to an unstretched or less stretched length when the door is not in a rolled position. The present invention is also usable in other roll-up door applications, such as for buildings with similar type roll-up doors (e.g., garage or warehouse door).

As further shown in the exemplary embodiment of FIG. 32, the planar structure 311 also includes a bottom attachable end portion 314 (e.g., beaded or sleeve and rigid cylinder end), which is detachably couplable to a bottom edge attachment feature 315, such as a fixable attachment mechanism having a C-shaped slot, or slotted circular profile section1 for slidably receiving the bottom attachable end portion 314. In one embodiment, the edge attachment feature 315 is attachable to the underlying roll-up door, such as by screws, glue, or other attachment mechanisms or methods known in the art.

Figure 33:
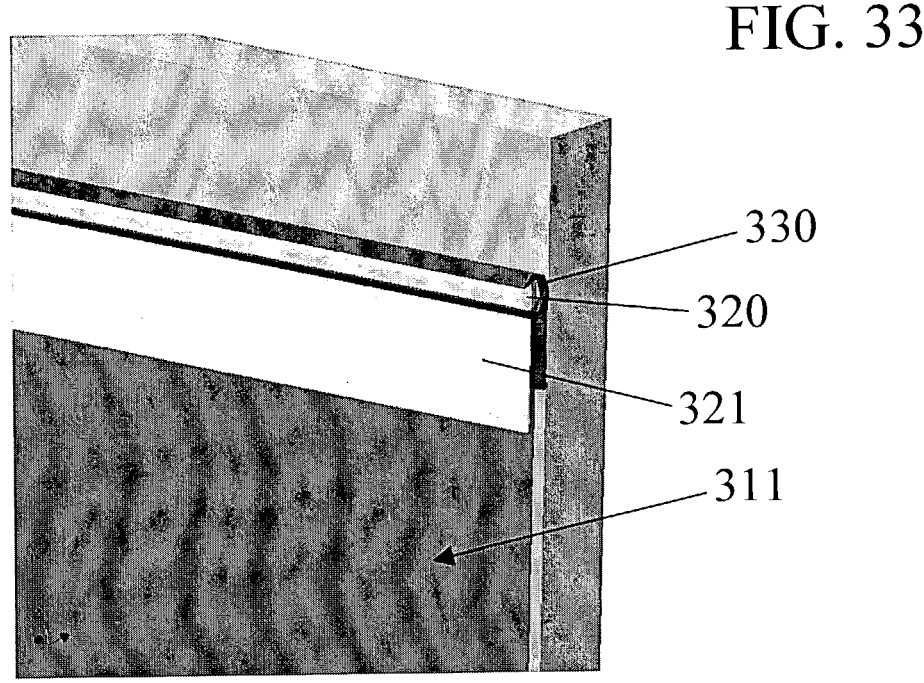

As shown in FIG. 33, in one exemplary embodiment, the top portion of the planar structure 311 includes a top attachable end portion 320, such as a beaded edge or sleeve and rigid cylinder. In one embodiment, the attachable end portion is coupled to or part of an end attachment or section 321 for the planar structure 311. As also shown in FIG. 33, in one embodiment, the attachable end portion 320 is detachably couplable to a top edge attachment feature 330, such as a fixable attachment mechanism having a C-shaped slot, or slotted circular profile section1 for slidably receiving the top attachable end portion 320. In one embodiment, the top edge attachment feature 330 is attachable to the underlying roll-up door, such as by screws, glue, or other attachment mechanisms or methods known in the art.

Figure 34:
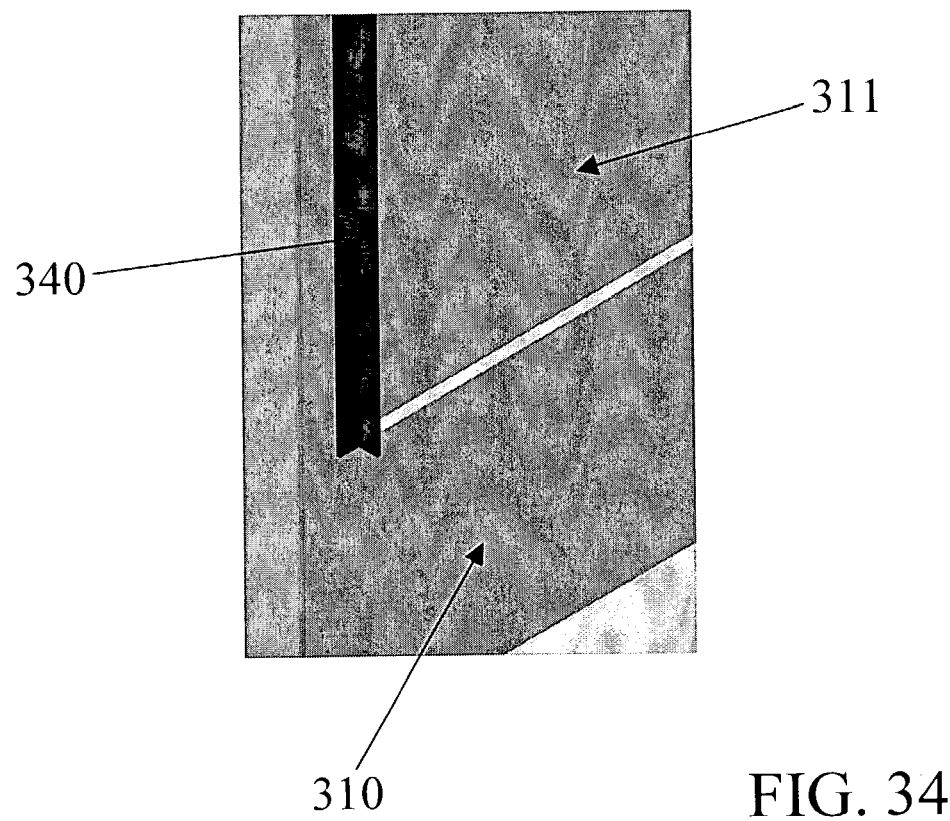
FIG. 34 presents a closeup view of optional planar structure side guide attachable, for example, to a roll-up door support structure, in accordance with an embodiment of the present invention.

FIG. 34 presents a closeup view of optional planar structure side guide 340, attachable, for example, to the roll-up door support structure 310. In use, the optional planar structure side guide 340 guides the side edges of the planar structure 311.

FIG. 35 presents example roll-up door application of the present invention, similar to as shown in FIGS. 31–33, to a series of roll-up doors contained in a single structure.

FIG. 36 shows an example framed canvas or other framed planar structure application of the present invention. Similar to the tensioning presented in sign, awning, and roll-up door applications, the present invention is usable for tensioning wall murals, for tensioning pylon signage (e.g., backlit planar sign structures), and for tensioning artist's canvas other than within a frame.

Example embodiments of the present invention have now been described in accordance with the above advantages. It will be appreciated that these examples are merely illustrative of the invention. Many variations and modifications will be apparent to those skilled in the art.

What is claimed is:

1. An attachment and tensioning system for mounting on the surface of a vehicle a planar flexible material having a shaped top edge, a shaped bottom edge, a first vertical edge, a second vertical edge opposite the first vertical edge, the system comprising:

a top rail securable to said surface and having a horizontally extending C-shaped slot open away from said surface for receiving the shaped top edge of the material;

a floating bottom rail slidable on said surface having a first horizontally extending C-shaped slot open away from said surface for receiving the shaped bottom edge of the material and a second horizontally extending C-shaped slot also open away from said surface;

a first fixed portion securable to said surface outwardly from said floating bottom rail and having a horizontally extending C-shaped slot open away from said surface; and a first lever-and-beam releasably lockable tensioner comprising a first bent lever arm having an inwardly bent shaped first end cammingly pivotably engageable in said floating bottom rail's second horizontally extending C-shaped slot and an inwardly open C-shaped slot, and a first beam having shaped ends pivotably connected to the inwardly open C-shaped slot of said first lever arm and pivotably engageable with the outwardly open C-shaped slot of said first fixed portion, whereby during mounting the first lever arm is pivoted toward said first fixed portion, thereby pulling the floating bottom rail toward said first fixed portion and releasably locking the first lever arm in place covering said first fixed portion.

2. The system of claim 1, wherein the shaped top edge and the shaped bottom edge of the planar flexible material are beaded edges.

3. The system of claim 1, wherein the shaped top edge and the shaped bottom edge of the planar flexible material each include a semi-enclosing edge and an insertion member insertable into the semi-enclosing edge.

4. The system of claim 3, wherein the insertion member is cylindrically shaped.

5. The system according to claim 1 wherein said vertical edges are shaped, additionally including a side rail securable to said surface and having a vertically extending C-shaped slot open away from said surface for receiving the first vertical edge; a floating side rail slidable on said surface having a first vertically extending C-shaped slot open away from said surface for receiving said second vertical edge and a second vertically extending C-shaped slot also open away from said surface; a second fixed portion securable to said surface outwardly from said floating side rail and having a vertically extending C-shaped slot open away from said surface; and a second lever-and-beam releasably lockable tensioner comprising a second bent lever arm having an inwardly bent shaped first end cammingly pivotably engageable in said floating side rail's second vertically extending C-shaped slot and a second beam having shaped ends pivotably connected to the inwardly open C-shaped slot of said second lever arm and pivotably engageable with the outwardly open C-shaped slot of said second fixed portion, whereby during mounting the second lever arm is pivoted toward the second fixed portion, thereby pulling the floating side rail toward the second fixed portion and releasably locking the second lever arm in place covering said second fixed portion.

6. The system of claim 5, wherein the planar flexible material is a sign.

7. The system of claim 5, wherein the shaped edges of the planar flexible material are beaded edges.

8. The system of claim 5, wherein the shaped edges of the planar flexible material each include a semi-enclosing edge and an insertion member insertable into the semi-enclosing edge.

9. The system of claim 1, further comprising: at least one end cap for holdably covering the tensioner in the locked position.

* * * * *